(12) United States Patent
Winarski et al.

(10) Patent No.: US 7,474,486 B2
(45) Date of Patent: *Jan. 6, 2009

(54) MAGNETIC STORAGE MEDIA

(75) Inventors: Daniel Winarski, Tucson, AZ (US); Nils Haustein, Zornheim (DE); Craig A. Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/283,358

(22) Filed: Nov. 18, 2005

(65) Prior Publication Data

US 2007/0115577 A1 May 24, 2007

(51) Int. Cl.
*G11B 5/09* (2006.01)
(52) U.S. Cl. .............................. 360/48; 360/55; 360/71
(58) Field of Classification Search .................. None
See application file for complete search history.

(56) References Cited

U.S. PATENT DOCUMENTS

| | | | |
|---|---|---|---|
| 3,614,756 A | 10/1971 | McIntosh et al. | |
| 3,812,533 A * | 5/1974 | Kimura et al. | 360/77.08 |
| 4,320,430 A * | 3/1982 | Vogt | 360/133 |
| 4,652,945 A | 3/1987 | Marchant | |
| 5,055,951 A | 10/1991 | Behr | |
| 5,291,348 A | 3/1994 | Copolillo | |
| 5,432,652 A | 7/1995 | Comeaux et al. | |
| 5,689,384 A | 11/1997 | Albrecht et al. | |
| 5,757,576 A * | 5/1998 | Kosugi | 360/78.14 |
| 5,786,957 A * | 7/1998 | Inoue et al. | 360/77.08 |
| 6,021,013 A | 2/2000 | Albrecht et al. | |
| 6,078,463 A * | 6/2000 | Pahr | 360/77.12 |
| 6,262,859 B1 * | 7/2001 | Cho | 360/77.08 |
| 6,282,051 B1 | 8/2001 | Albrecht et al. | |
| 6,320,719 B1 | 11/2001 | Albrecht et al. | |
| 6,462,904 B1 | 10/2002 | Albrecht et al. | |
| 6,781,778 B1 * | 8/2004 | Molstad et al. | 360/48 |
| 6,873,482 B1 | 3/2005 | Hsieh et al. | |
| 6,873,487 B2 * | 3/2005 | Molstad | 360/75 |
| 6,879,457 B2 * | 4/2005 | Eaton et al. | 360/75 |
| 6,970,312 B2 * | 11/2005 | Yip et al. | 360/48 |
| 7,012,774 B2 * | 3/2006 | Nakao et al. | 360/48 |
| 7,106,544 B2 * | 9/2006 | Dugas et al. | 350/75 |
| 7,130,140 B1 * | 10/2006 | Boyer et al. | 360/48 |
| 7,142,388 B2 * | 11/2006 | Tateishi et al. | 360/77.12 |

(Continued)

*Primary Examiner*—K. Wong
(74) *Attorney, Agent, or Firm*—David W. Victor; Konrad Raynes & Victor LLP

(57) ABSTRACT

A magnetic storage media includes one or more magnetic polarity encoded servo bands with each magnetic polarity encoded servo band including one or more magnetic south-north servo band sections and one or more magnetic north-south servo band sections. Each magnetic south-north servo band section includes a magnetic south-pole polarity initialized servo track segment and a magnetic north-pole polarity servo pattern recorded on the magnetic south-pole polarity initialized servo track segment. Each magnetic north-south servo band section includes a magnetic north-pole polarity initialized servo track segment, and a magnetic south-pole polarity servo pattern recorded on the magnetic north-pole polarity initialized servo track segment. The magnetic south-north servo band section(s) and the magnetic north-south servo band section(s) are recorded relative to each other on a servo track to represent magnetic polarity encoded servo position information based on the magnetic north-pole polarity servo pattern(s) and the magnetic south-pole polarity servo pattern(s).

20 Claims, 18 Drawing Sheets

U.S. PATENT DOCUMENTS

| | | | |
|---|---|---|---|
| 7,187,511 B2 * | 3/2007 | Nakao | 360/48 |
| 7,190,551 B2 * | 3/2007 | Suda | 360/121 |
| 7,199,957 B2 * | 4/2007 | Rothermel et al. | 360/48 |
| 7,224,544 B2 * | 5/2007 | Takano et al. | 360/66 |
| 7,230,790 B1 * | 6/2007 | Mallary et al. | 360/77.08 |
| 7,283,317 B2 * | 10/2007 | Dugas et al. | 360/48 |
| 2004/0174132 A1 | 9/2004 | Johnson et al. | |
| 2004/0252394 A1 * | 12/2004 | Hamaguchi et al. | 360/48 |
| 2005/0057839 A1 | 3/2005 | Ohtsu | |

* cited by examiner

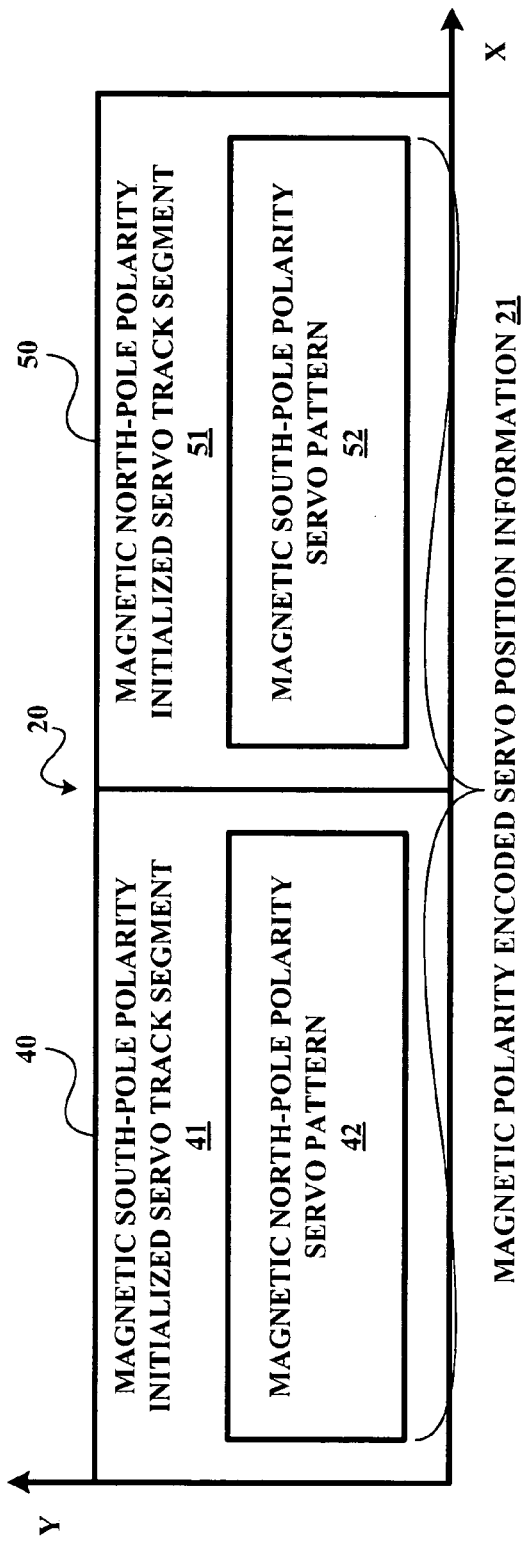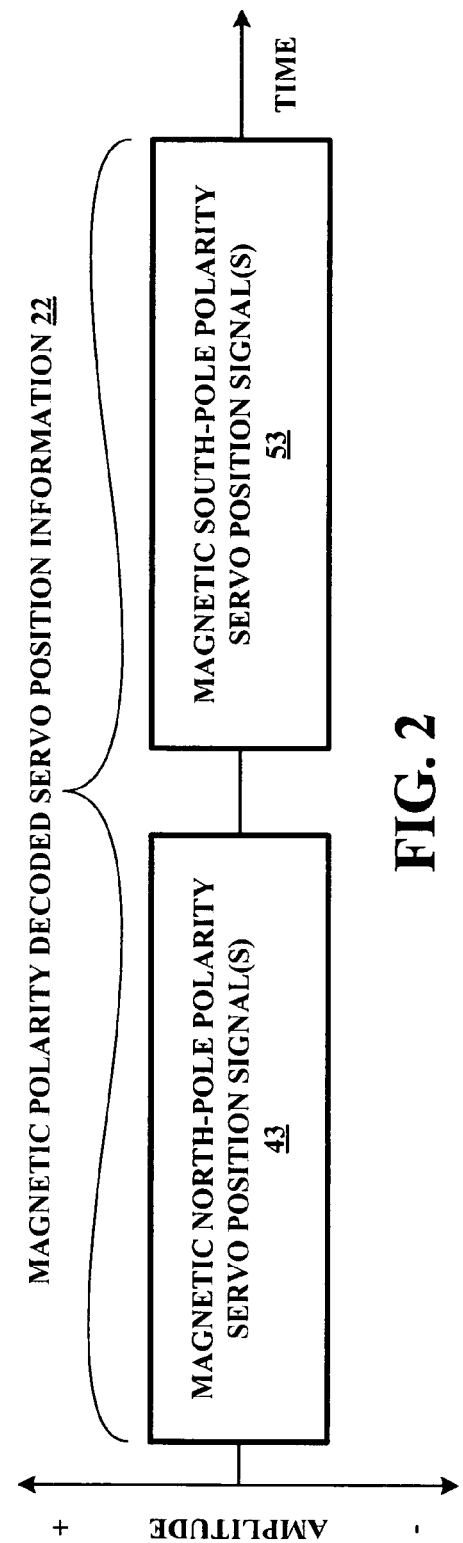
FIG. 1
FIG. 2

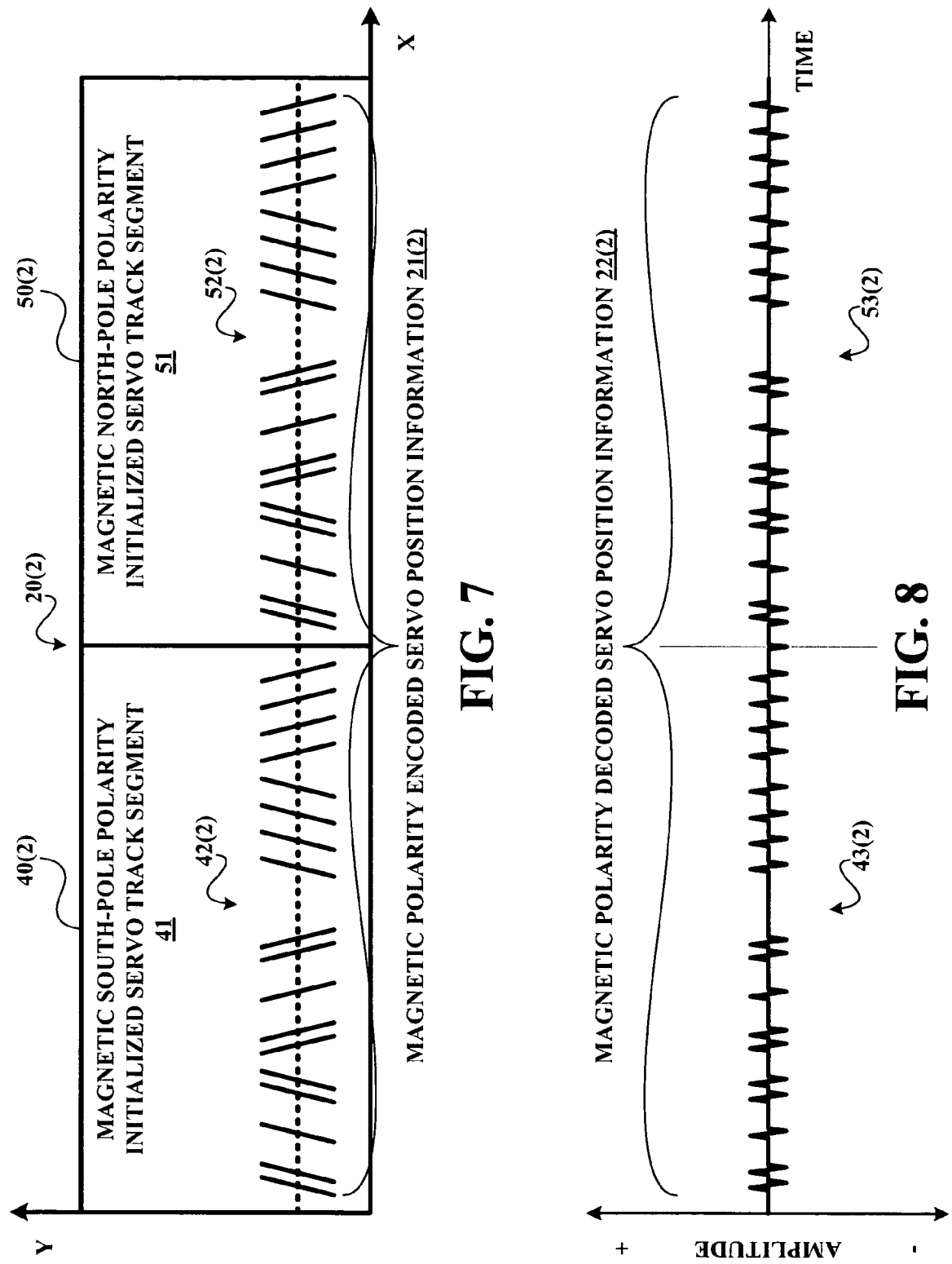

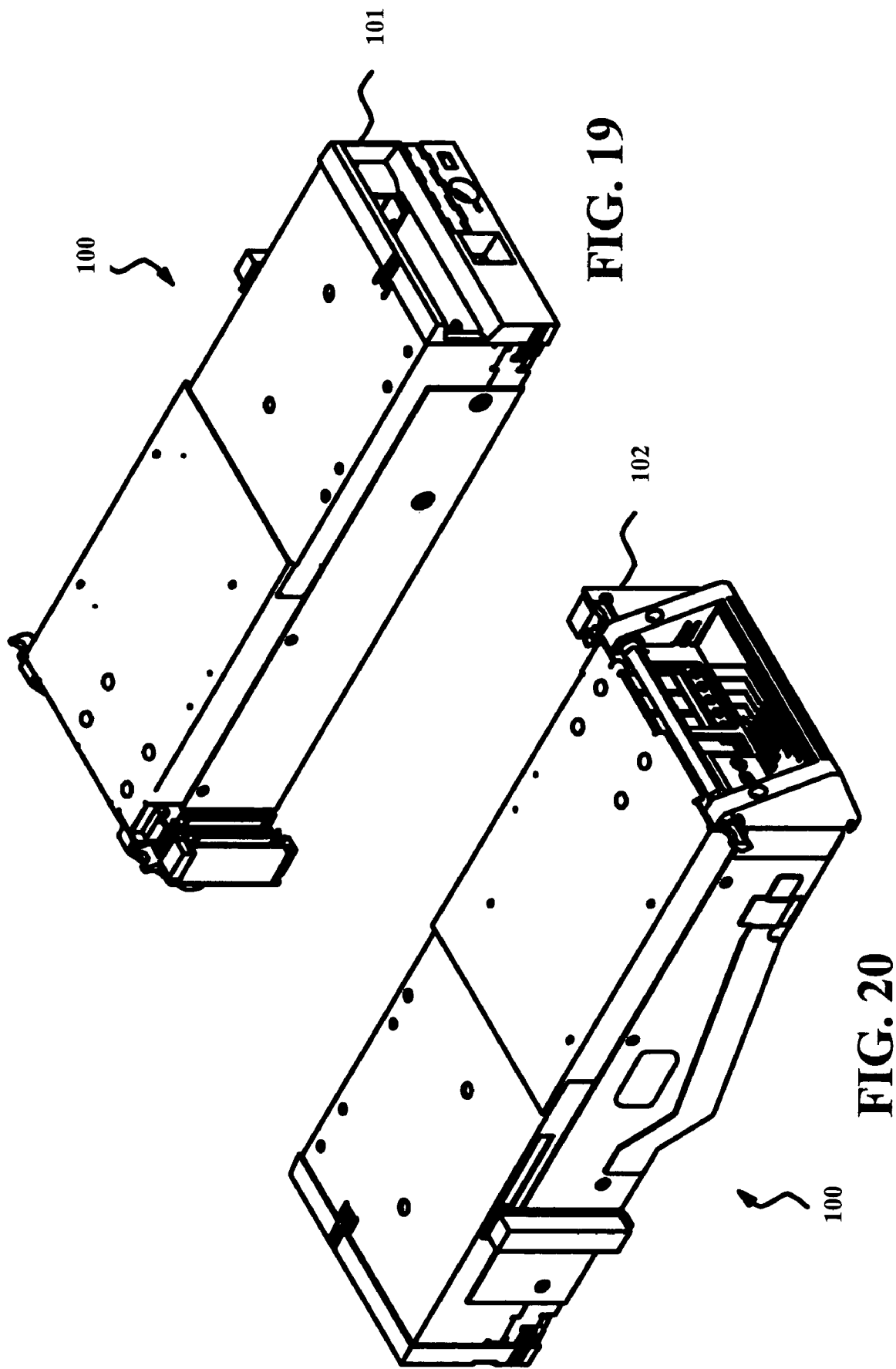

MAGNETIC STORAGE MEDIA

FIELD OF THE INVENTION

The present invention generally relates to servo position information recorded on magnetic-based storage media (e.g., a magnetic tape, a magneto-optical tape and an optical phase-change tape). The present invention specifically relates to a magnetic-polarity encoding of the servo position information as recorded on the magnetic-based storage media.

BACKGROUND OF THE INVENTION

The recording and reading of data in tracks on magnetic storage media requires precise positioning of magnetic read/write heads. Specifically, a magnetic write head must be quickly moved to and centered over a data track to facilitate a selective recording of data onto the data track. In operation, the magnetic write head records data onto the data track as relative movement occurs between the magnetic write head and the magnetic storage media in a transducing direction. Thereafter, the magnetic write head can be moved across the width of the magnetic storage media in a translating direction, which is perpendicular to the transducing direction, to a different data track to thereby selectively record data onto this data track.

Similarly, a magnetic read head must be quickly moved to and centered over a data track to facilitate reading of data recorded on the data track. In operation, the magnetic read head reads data recorded onto the data track as relative movement occurs between the magnetic read head and the magnetic storage media in the transducing direction. Thereafter, the magnetic read head can be moved across the width of the magnetic storage media in the translating direction, which again is perpendicular to the transducing direction, to a different data track to thereby selectively read data recorded onto this data track.

Storage drive devices that employ such magnetic heads for recording data on data tracks of a magnetic storage media and for reading data recorded on the data tracks on magnetic storage media typically use servo control systems to properly position the magnetic heads in the translating direction. A servo control system derives servo position information from a servo read head that reads servo position information recorded in one or more servo tracks that are advantageously recorded among the data tracks of the magnetic storage media. Based on the servo position information, the servo control system properly aligns the servo read head as needed relative to the servo track(s) being read whereby an associated magnetic head will concurrently be properly aligned with a data track for facilitating a recording of data onto that data track or a reading of recorded data from that data track.

A design of a servo pattern for encoding the servo position information is essential to the ability of the servo control system in deriving the servo position information. An example of one type of servo pattern for encoding servo position information is a magnetic timing based servo pattern that facilitates a decoding of servo position information indicating a translational position of the servo read head relative to the magnetic storage media. The magnetic time based servo pattern can further encode the servo position information whereby the decoded servo position information further indicates a transducing position of the servo read head relative to the magnetic storage media.

Another example of a servo pattern for encoding servo position information is a magnetic bit-character differential based servo pattern that facilitates a derivation of servo position information indicating a translational position of the servo read head relative to the magnetic storage media. The magnetic bit-character differential based servo pattern can further encode the servo position information whereby the servo position information further indicates a transducing position of the servo read head relative to the magnetic storage media.

SUMMARY OF THE INVENTION

The present invention provides new and unique magnetic polarity encoded servo bands that further advance servo control technology.

In one embodiment the invention comprises magnetic storage media that comprises at least one magnetic polarity encoded servo band having a width. Each magnetic polarity encoded servo band includes at least one magnetic south-north servo band section, each magnetic south-north servo band section including a magnetic south-pole polarity initialized servo track segment across all the width, and a magnetic north-pole polarity servo pattern recorded on the magnetic south-pole polarity initialized servo track segment. At least one magnetic north-south servo band section, each magnetic north-south servo band section including a magnetic north-pole polarity initialized servo track segment across all the width, and a magnetic south-pole polarity servo pattern recorded on the magnetic north-pole polarity initialized servo track segment. The at least one magnetic south-north servo band section and the at least one magnetic north-south servo band section are recorded relative to each other on a servo track to represent magnetic polarity encoded servo position information based on each magnetic north-pole polarity servo pattern and each magnetic south-pole polarity servo pattern.

A second embodiment the invention comprises a storage media cartridge comprising a cartridge housing adapted to interface with a cartridge drive, and a magnetic storage media contained within the cartridge housing. The magnetic storage media includes one or more magnetic polarity encoded servo bands having a width with each magnetic polarity encoded servo band including one or more magnetic south-north servo band sections and one or more magnetic north-south servo band sections. Each magnetic south-north servo band section includes a magnetic south-pole polarity initialized servo track segment across all the width and a magnetic north-pole polarity servo pattern recorded on the magnetic south-pole polarity initialized servo track segment. Each magnetic north-south servo band section includes a magnetic north-pole polarity initialized servo track segment across all the width, and a magnetic south-pole polarity servo pattern recorded on the magnetic north-pole polarity initialized servo track segment. The magnetic south-north servo band section(s) and the magnetic north-south servo band section(s) are recorded relative to each other on a servo track to represent magnetic polarity encoded servo position information based on the magnetic north-pole polarity servo pattern(s) and the magnetic south-pole polarity servo pattern(s).

A third embodiment of the invention is a magnetic storage media drive comprising a transducer, a servo decoder and a server controller. The transducer includes a servo read head operable to generate a read head signal representative of a reading of at least one servo pattern recorded on a magnetic storage media a magnetic storage media including at least one magnetic polarity encoded servo band having a width. Each magnetic polarity encoded servo band includes at least one magnetic south-north servo band section and at least one magnetic north-south servo band section. Each magnetic south-north servo band section includes a magnetic south-pole polarity initialized servo track segment, and a magnetic north-pole polarity servo pattern recorded on the magnetic south-pole polarity initialized servo track segment. Each magnetic north-south servo band section including a magnetic north-pole polarity initialized servo track segment across all the width, and a magnetic south-pole polarity servo pattern recorded on the magnetic north-pole polarity initialized servo track segment. The magnetic south-north servo band section(s) and the magnetic north-south servo band section(s) are recorded relative to each other on a servo track to represent magnetic polarity encoded servo position information based on each magnetic north-pole polarity servo pattern and each magnetic south-pole polarity servo pattern. The servo decoder is in electrical communication with the transducer to receive the read head signal and is operable to generate a decoded servo position signal based on the read head signal, the decoded servo position signal being indicative of a position of the transducer relative to the magnetic storage media. The servo controller is in electrical communication with the servo decoder to receive the decoded servo position signal, the servo controller being operable to generate a servo control signal for selectively moving the transducer relative to the magnetic storage media.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 1 illustrates a first embodiment of a magnetic polarity encoded servo position information in accordance with the present invention;

FIG. 2 illustrates exemplary magnetic polarity decoded servo position information associated with the magnetic polarity encoded servo position information illustrated in FIG. 1 in accordance with the present invention;

FIG. 7 illustrates a second exemplary embodiment of the magnetic polarity encoded servo position information illustrated in FIG. 1 in accordance with the present invention;

FIG. 8 illustrates exemplary magnetic polarity decoded servo position information associated with the magnetic polarity encoded servo position information illustrated in FIG. 7 in accordance with the present invention;

FIGS. 19 and 20 respectively illustrate a front view and rear view of one embodiment of a tape drive in accordance with the present invention;

DETAILED DESCRIPTION OF THE PRESENT INVENTION

Figure 3:
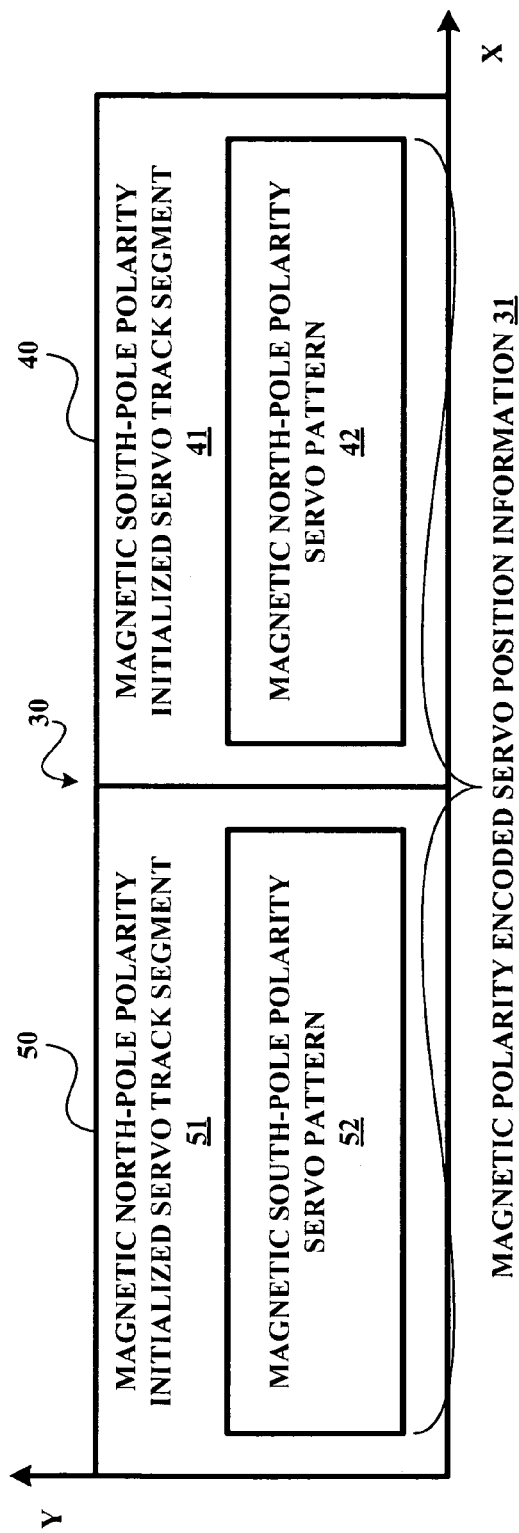
FIG. 3 illustrates a second embodiment of a magnetic polarity encoded servo position information in accordance with the present invention.

FIG. 1 illustrates a magnetic polarity encoded servo band 20 of the present invention employing a magnetic south-north servo band section 40 and a magnetic north-south servo band section 50 as recorded on a servo track of a magnetic storage media (not shown). Magnetic south-north servo band section 40 includes a magnetic south-pole polarity initialized servo track segment 41 and a magnetic north-pole polarity servo pattern 42 recorded on magnetic south-pole polarity initialized servo track segment 41. Magnetic north-south servo band section 50 includes a magnetic north-pole polarity initialized servo track segment 51, and a magnetic south-pole polarity servo pattern 52 recorded on magnetic north-pole polarity initialized servo track segment 51.

Magnetic south-north servo band section 40 and magnetic north-south servo band section 50 are recorded relative to each other on a servo track to represent magnetic polarity encoded servo position information 21 based on magnetic north-pole polarity servo pattern 42 and magnetic south-pole polarity servo pattern 52. In one embodiment, magnetic south-north servo band section 40 and magnetic north-south servo band section 50 are bordering each other on the servo track as shown in FIG. 1. In an alternative embodiment, magnetic south-north servo band section 40 and magnetic north-south servo band section 50 can be spaced from each other on the servo track.

In operation, a first servo read of magnetic south-north servo band section 40 generates one or more magnetic north-pole polarity servo position signals 43 as shown in FIG. 2 in dependence upon the format of magnetic north-pole polarity servo pattern 42. Similarly, a second servo read of magnetic north-south servo band section 50 generates one or more magnetic south-pole polarity servo position signals 53 as shown in FIG. 2 in dependence upon the format of magnetic south-pole polarity servo pattern 52. Collectively, magnetic north-pole polarity servo position signals 43 and magnetic south-pole polarity servo position signals 53 represent magnetic polarity decoded servo position information 22 for facilitating a determination of a translational position of a servo transducer (not shown) along a translation axis Y. Magnetic polarity decoded servo position information 22 may also facilitate a determination of a transducing position of the servo transducer along a transducing axis X in dependence upon the format of magnetic north-pole polarity servo pattern 42 and/or the format of magnetic south-pole polarity servo pattern 52.

FIG. 3 illustrates a magnetic polarity encoded servo band 30 of the present invention employing a reverse order of magnetic south-north servo band section 40 and magnetic north-south servo band section 50 as recorded on a servo track of a magnetic storage media (not shown). In this embodiment, magnetic south-north servo band section 40 and magnetic north-south servo band section 50 are recorded relative to each other on the servo track to represent magnetic polarity encoded servo position information 31 based on the reverse order of magnetic north-pole polarity servo pattern 42 and the magnetic south-pole polarity servo pattern 52. In one embodiment, magnetic south-north servo band section 40 and magnetic north-south servo band section 50 are bordering each other on the servo track as shown in FIG. 3. In an alternative embodiment, magnetic south-north servo band section 40 and magnetic north-south servo band section 50 can be spaced from each other on the servo track.

Figure 4:
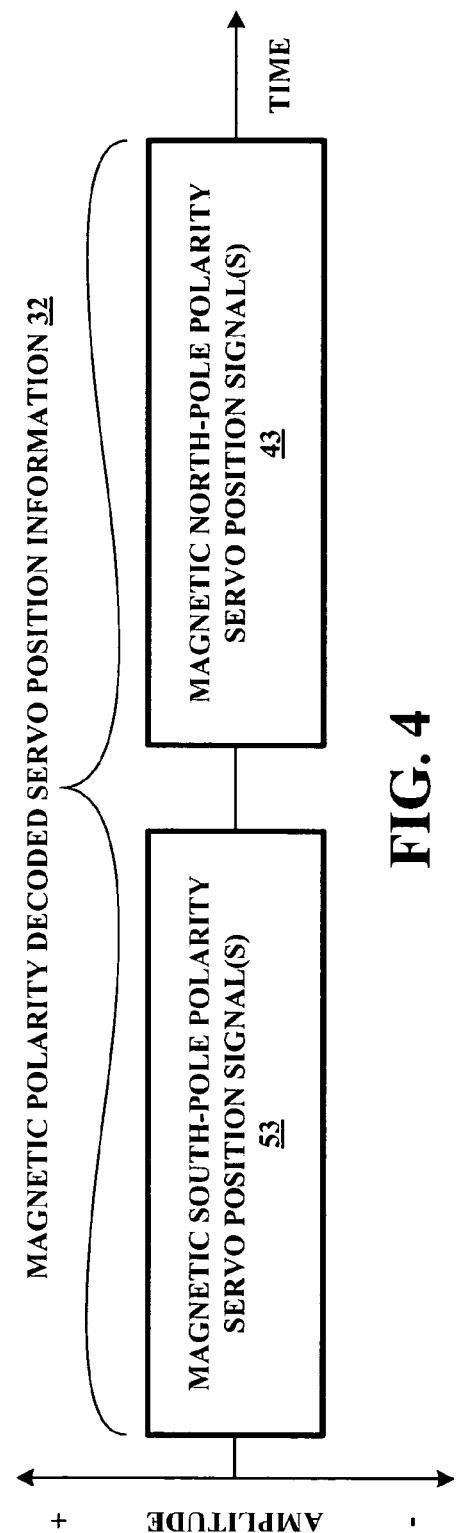
FIG. 4 illustrates exemplary magnetic polarity decoded servo position information associated with the magnetic polarity encoded servo position information illustrated in FIG. 3 in accordance with the present invention.

In operation, a first servo read of magnetic north-south servo band section 50 generates one or more magnetic south-pole polarity servo position signals 53 as shown in FIG. 4 in dependence upon the format of magnetic south-pole polarity servo pattern 52. Similarly, a second servo read of magnetic south-north servo band section 40 generates one or more magnetic north-pole polarity servo position signals 43 as shown in FIG. 4 in dependence upon the format of magnetic north-pole polarity servo pattern 42. Collectively, magnetic south-pole polarity servo position signals 53 and magnetic north-pole polarity servo position signals 43 represent magnetic polarity decoded servo position information 32 for facilitating a determination of a translational position of a servo transducer (not shown) along a translation axis Y. Magnetic polarity decoded servo position information 32 may also facilitate a determination of a transducing position of the servo transducer along a transducing axis X in dependence upon the format of magnetic north-pole polarity servo pattern 42 and/or the format of magnetic south-pole polarity servo pattern 52.

Referring to FIGS. 1 and 3, in practice, the present invention does not impose any limitations or any restrictions as to the format of magnetic north-pole polarity servo pattern 42 and as to the format of magnetic south-pole polarity servo pattern 52. For example, the format of magnetic north-pole polarity servo pattern 42 may or may not be identical to the format of magnetic south-pole polarity servo pattern 52. As such, the following description of exemplary embodiments of patterns 42 and 52 as shown in FIGS. 5, 7, 9, 11 and 13 neither limits nor restricts the scope of the format of patterns 42 and 52.

Figure 5:
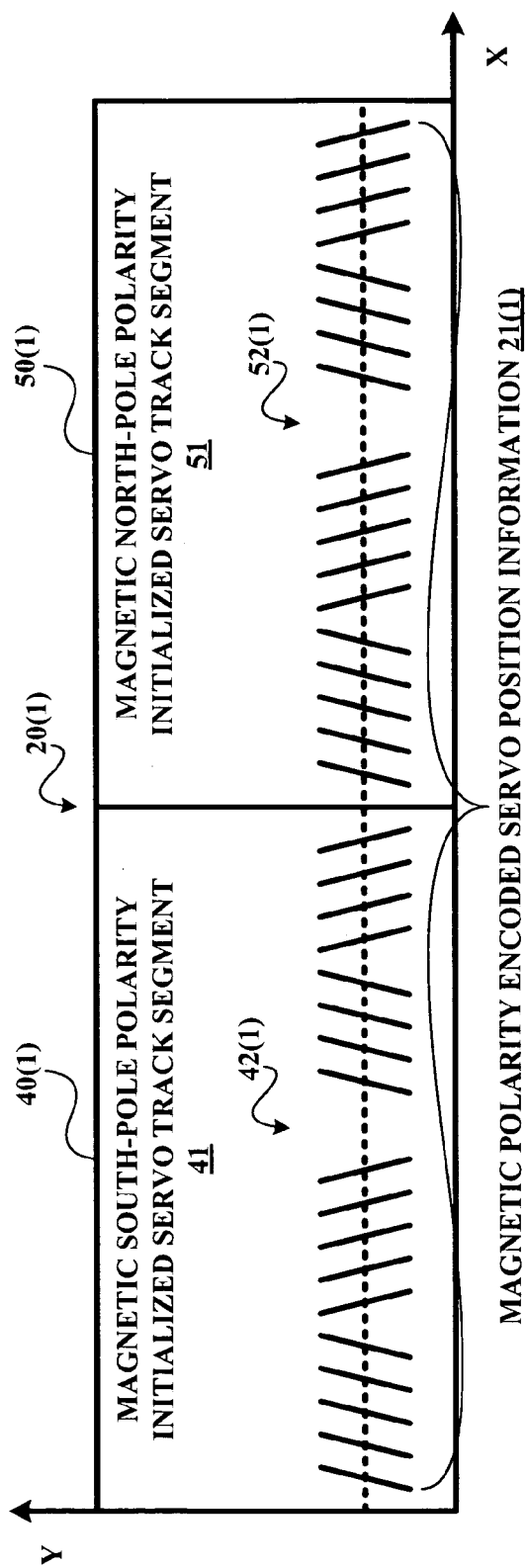
FIG. 5 illustrates a first exemplary embodiment of the magnetic polarity encoded servo position information illustrated in FIG. 1 in accordance with the present invention.

FIG. 5 illustrates a basic timing based servo embodiment of the present invention. In this embodiment, from left-to-right, a magnetic north-pole polarity servo pattern 42(1) includes a standard A-burst of five (5) magnetic north-pole polarity forward-slash stripes (/////), a standard B-burst of five (5) magnetic north-pole polarity backward-slash stripes (\\\\\), a standard C-burst of four (4) magnetic north-pole polarity forward-slash stripes (////) and a standard D-burst of four (4) magnetic north-pole polarity backward-slash stripes (\\\\) as would be appreciated by those having ordinary skill in the art. Similarly, a magnetic south-pole polarity servo pattern 52(1) includes a standard A-burst of five (5) magnetic south-pole polarity forward-slash stripes (/////), a standard B-burst of five (5) magnetic south-pole polarity backward-slash stripes (\\\\\), a standard C-burst of four (4) magnetic south-pole polarity forward-slash stripes (////) and a standard D-burst of four (4) magnetic south-pole polarity backward-slash stripes (\\\\) as would be appreciated by those having ordinary skill in the art.

Figure 6:
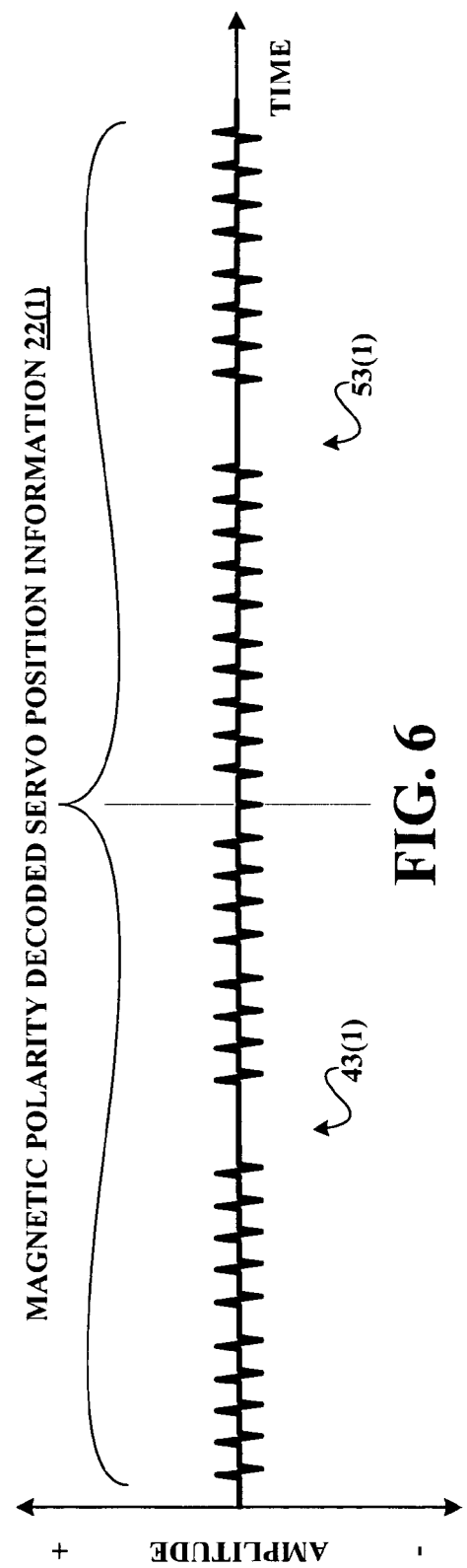
FIG. 6 illustrates exemplary magnetic polarity decoded servo position information associated with the magnetic polarity encoded servo position information illustrated in FIG. 5 in accordance with the present invention.

In operation, a first servo read of magnetic south-north servo band section 40(1) generates magnetic north-pole polarity servo position signals 43(1) as shown in FIG. 6 that are representative of the time based servo format of magnetic north-pole polarity servo pattern 42(1). Similarly, a second servo read of magnetic north-south servo band section 50(1) generates one or more magnetic south-pole polarity servo position signals 53(1) as shown in FIG. 6 that are representative of the time based servo format of magnetic south-pole polarity servo pattern 52(1). Collectively, magnetic north-pole polarity servo position signals 43(1) and magnetic south-pole polarity servo position signals 53(1) represent magnetic polarity decoded servo position information 22(1) for facilitating a determination of a translational position of a servo transducer (not shown) along a translation axis Y as would be appreciated by those having ordinary skill in the art. Magnetic polarity decoded servo position information 22(1) may also facilitate a determination of a coarse transducing position of the servo transducer along a transducing axis X as would be appreciated by those having ordinary skill in the art.

FIG. 7 illustrates an alphanumeric "1" encoded timing based servo embodiment of the present invention. In this embodiment, a magnetic north-pole polarity servo pattern 42(2) includes an alphanumeric "1" encoded A-burst of five (5) magnetic north-pole polarity forward-slash stripes (/////), an alphanumeric "1" B-burst of five (5) magnetic north-pole polarity backward-slash stripes (\\\\\), a standard C-burst of four (4) magnetic north-pole polarity forward-slash stripes (////) and a standard D-burst of four (4) magnetic north-pole polarity backward-slash stripes (\\\\) as would be appreciated by those having ordinary skill in the art. Similarly, a magnetic south-pole polarity servo pattern 52(2) includes an alphanumeric "1" encoded A-burst of five (5) magnetic south-pole polarity forward-slash stripes (/////), an alphanumeric "1" B-burst of five (5) magnetic south-pole polarity backward-slash stripes (\\\\\), a standard C-burst of four (4) magnetic south-pole polarity forward-slash stripes (////) and a standard D-burst of four (4) magnetic south-pole polarity backward-slash stripes (\\\\) as would be appreciated by those having ordinary skill in the art.

In operation, a first servo read of magnetic south-north servo band section 40(2) generates magnetic north-pole polarity servo position signals 43(2) as shown in FIG. 8 that are representative of the alphanumeric "1" encoded time based servo format of magnetic north-pole polarity servo pattern 42(2). Similarly, a second servo read of magnetic north-south servo band section 50(2) generates one or more magnetic south-pole polarity servo position signals 53(2) as shown in FIG. 8 that are representative of the alphanumeric "1" encoded time based servo format of magnetic south-pole polarity servo pattern 52(2). Collectively, magnetic north-pole polarity servo position signals 43(2) and magnetic south-pole polarity servo position signals 53(2) render magnetic polarity encoded servo position information 22(2) for facilitating a determination of a translational position of a servo transducer (not shown) along a translation axis Y. Magnetic polarity encoded servo position information 22(2) also facilitates a determination of a refined transducing position of the servo transducer along a transducing axis X.

Figure 9:
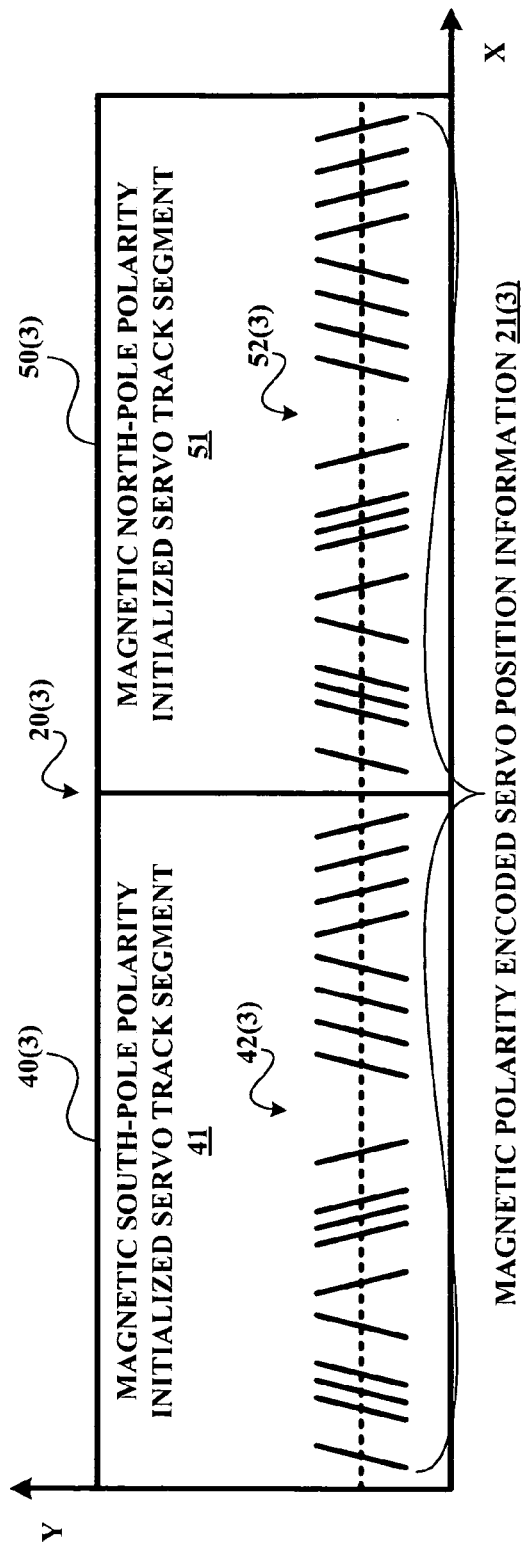
FIG. 9 illustrates a third exemplary embodiment of the magnetic polarity encoded servo position information illustrated in FIG. 1 in accordance with the present invention.

FIG. 9 illustrates an alphanumeric "0" encoded timing based servo embodiment of the present invention. In this embodiment, a magnetic north-pole polarity servo pattern 42(3) includes an alphanumeric "0" encoded A-burst of five (5) magnetic north-pole polarity forward-slash stripes (/////), an alphanumeric "0" encoded B-burst of five (5) magnetic north-pole polarity backward-slash stripes (\\\\\), a standard C-burst of four (4) magnetic north-pole polarity forward-slash stripes (////) and a standard D-burst of four (4) magnetic north-pole polarity backward-slash stripes (\\\\) as would be appreciated by those having ordinary skill in the art. Similarly, a magnetic south-pole polarity servo pattern 52(3) includes an alphanumeric "0" encoded A-burst of five (5) magnetic south-pole polarity forward-slash stripes (/////), an alphanumeric "0" encoded B-burst of five (5) magnetic south-pole polarity backward-slash stripes (\\\\\), a standard C-burst of four (4) magnetic south-pole polarity forward-slash stripes (////) and a standard D-burst of four (4) magnetic south-pole polarity backward-slash stripes (\\\\) as would be appreciated by those having ordinary skill in the art.

Figure 10:
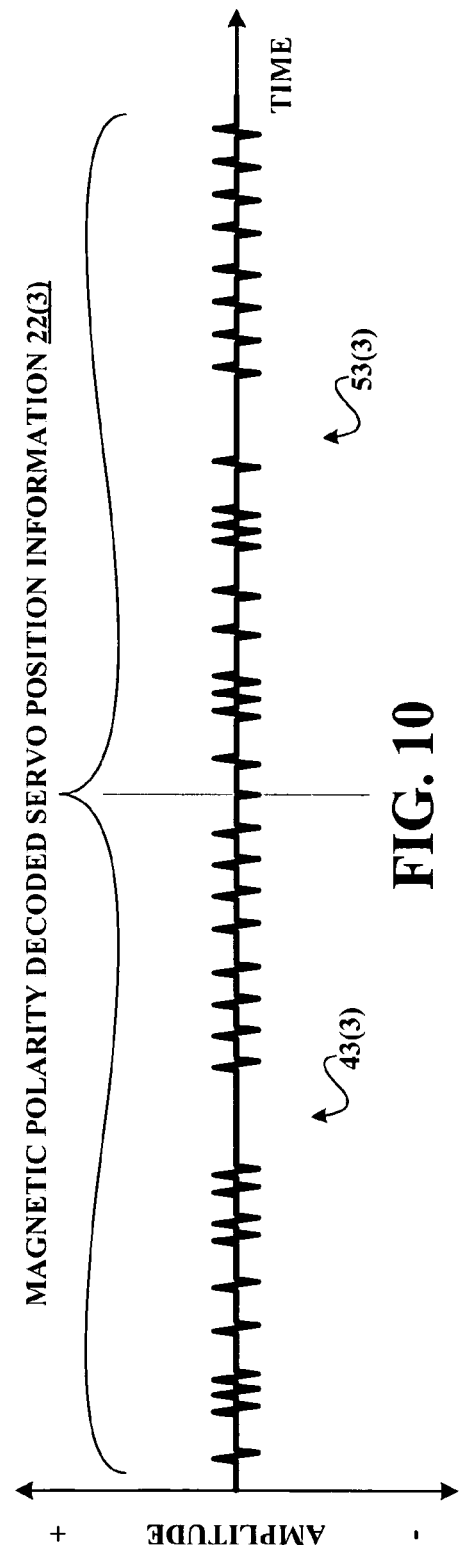
FIG. 10 illustrates exemplary magnetic polarity decoded servo position information associated with the magnetic polarity encoded servo position information illustrated in FIG. 9 in accordance with the present invention.

In operation, a first servo read of magnetic south-north servo band section 40(3) generates magnetic north-pole polarity servo position signals 43(3) as shown in FIG. 10 that are representative of the alphanumeric "0" encoded time based servo format of magnetic north-pole polarity servo pattern 42(3). Similarly, a second servo read of magnetic north-south servo band section 50(3) generates one or more magnetic south-pole polarity servo position signals 53(3) as shown in FIG. 10 that are representative of the alphanumeric "0" encoded time based servo format of magnetic south-pole polarity servo pattern 52(3). Collectively, magnetic north-pole polarity servo position signals 43(3) and magnetic south-pole polarity servo position signals 53(3) represent magnetic polarity decoded servo position information 22(3) for facilitating a determination of a translational position of a servo transducer (not shown) along a translation axis Y. Magnetic polarity decoded servo position information 22(3) also facilitates a determination of a refined transducing position of the servo transducer along a transducing axis X.

Figure 11:
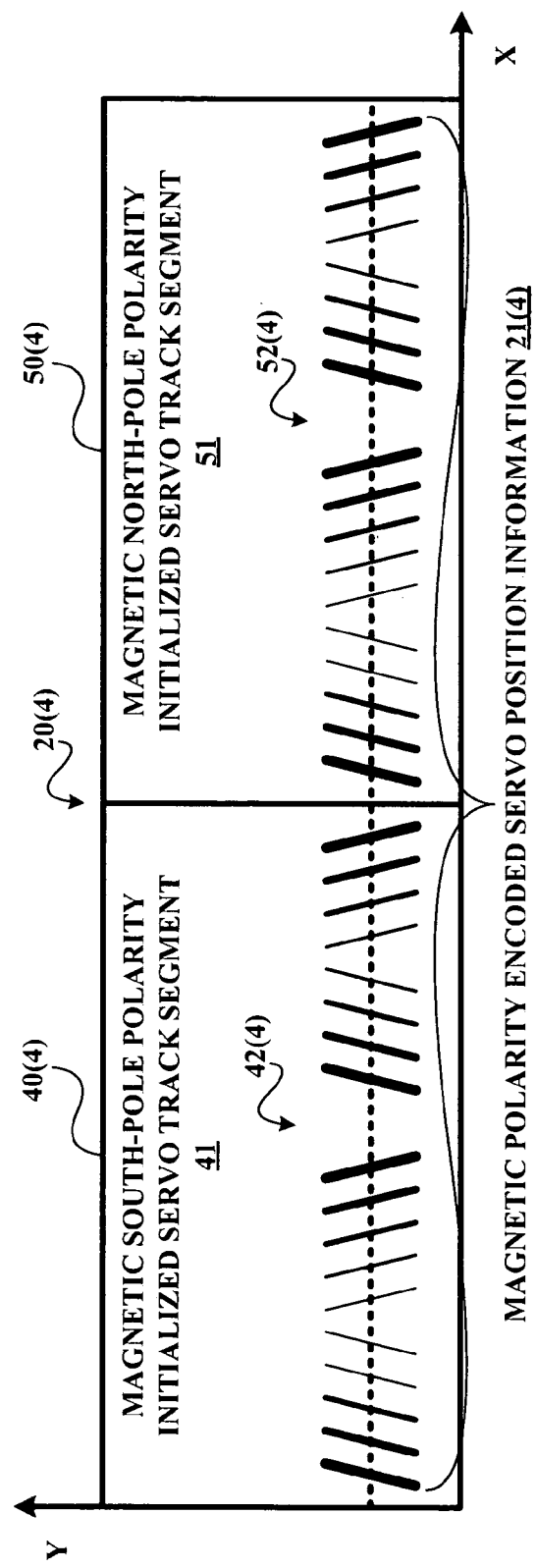
FIG. 11 illustrates a fourth exemplary embodiment of the magnetic polarity encoded servo position information illustrated in FIG. 1 in accordance with the present invention.

FIG. 11 illustrates a magnetic intensity encoded timing based servo embodiment of the present invention. In this embodiment, a magnetic north-pole polarity servo pattern 42(4) includes a magnetic intensity encoded A-burst of five (5) magnetic north-pole polarity forward-slash stripes (/////), a magnetic intensity encoded B-burst of five (5) magnetic north-pole polarity backward-slash stripes (\\\\\), a magnetic intensity encoded C-burst of four (4) magnetic north-pole polarity forward-slash stripes (////) and a magnetic intensity encoded D-burst of four (4) magnetic north-pole polarity backward-slash stripes (\\\\) as would be appreciated by those having ordinary skill in the art. Similarly, a magnetic south-pole polarity servo pattern 52(4) includes a magnetic intensity encoded A-burst of five (5) magnetic south-pole polarity forward-slash stripes (/////), a magnetic intensity encoded B-burst of five (5) magnetic south-pole polarity backward-slash stripes (\\\\\), a magnetic intensity encoded C-burst of four (4) magnetic south-pole polarity forward-slash stripes (////) and a magnetic intensity encoded D-burst of four (4) magnetic south-pole polarity backward-slash stripes (\\\\) as would be appreciated by those having ordinary skill in the art.

For the illustrated embodiment, the magnetic intensity pattern for the A-B burst pair involves the outermost stripes having the highest magnetic intensity and the innermost strips having the lowest magnetic intensity as would be appreciated by those having ordinary skill in the art. Similarly, the magnetic intensity pattern for C-D burst pair involves the outermost stripes having the highest magnetic intensity and the innermost strips having the having the lowest magnetic intensity as would be appreciated by those having ordinary skill in the art. In practice, the present invention does not impose any limitations or any restrictions to the magnetic intensity pattern adopted for the A-B burst pair and the C-D burst pair.

Figure 12:
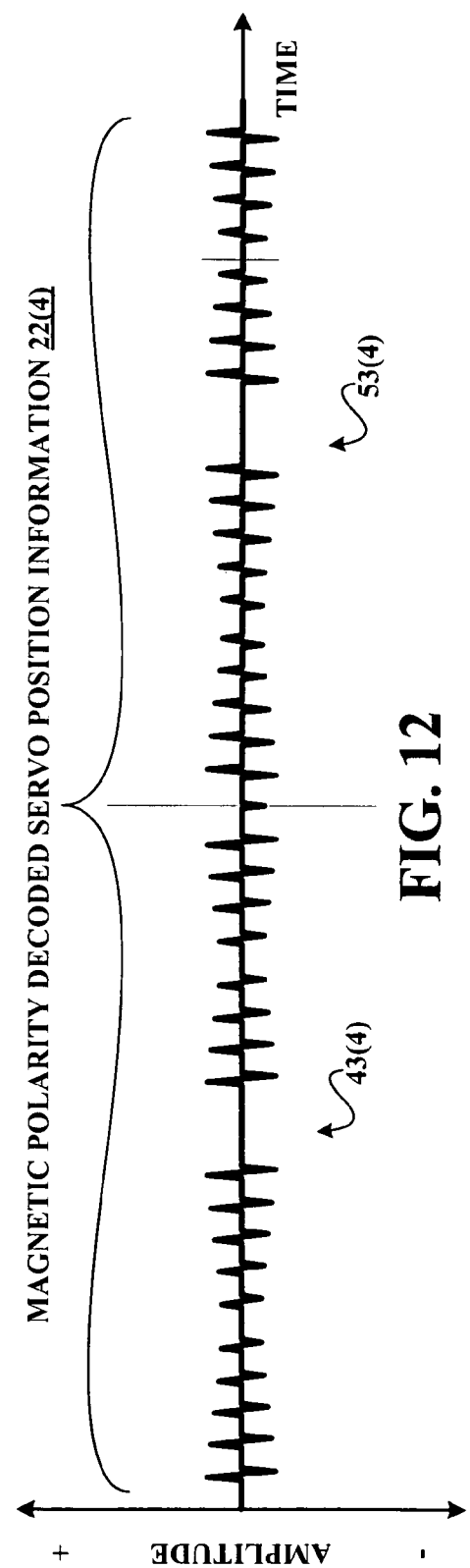
FIG. 12 illustrates exemplary magnetic polarity decoded servo position information associated with the magnetic polarity encoded servo position information illustrated in FIG. 11 in accordance with the present invention.

In operation, a first servo read of magnetic south-north servo band section 40(4) generates magnetic north-pole polarity servo position signals 43(4) as shown in FIG. 12 that are representative of the magnetic intensity encoded time based servo format of magnetic north-pole polarity servo pattern 42(4). Similarly, a second servo read of magnetic north-south servo band section 50(4) generates one or more magnetic south-pole polarity servo position signals 53(4) as shown in FIG. 12 that are representative of the magnetic intensity encoded time based servo format of magnetic south-pole polarity servo pattern 52(4). Collectively, magnetic north-pole polarity servo position signals 43(4) and magnetic south-pole polarity servo position signals 53(4) represent magnetic polarity decoded servo position information 22(4) for facilitating a determination of a translational position of a servo transducer (not shown) along a translation axis Y. Magnetic polarity decoded servo position information 22(4) also facilitates a determination of a refined transducing position of the servo transducer along a transducing axis X.

Figure 13:
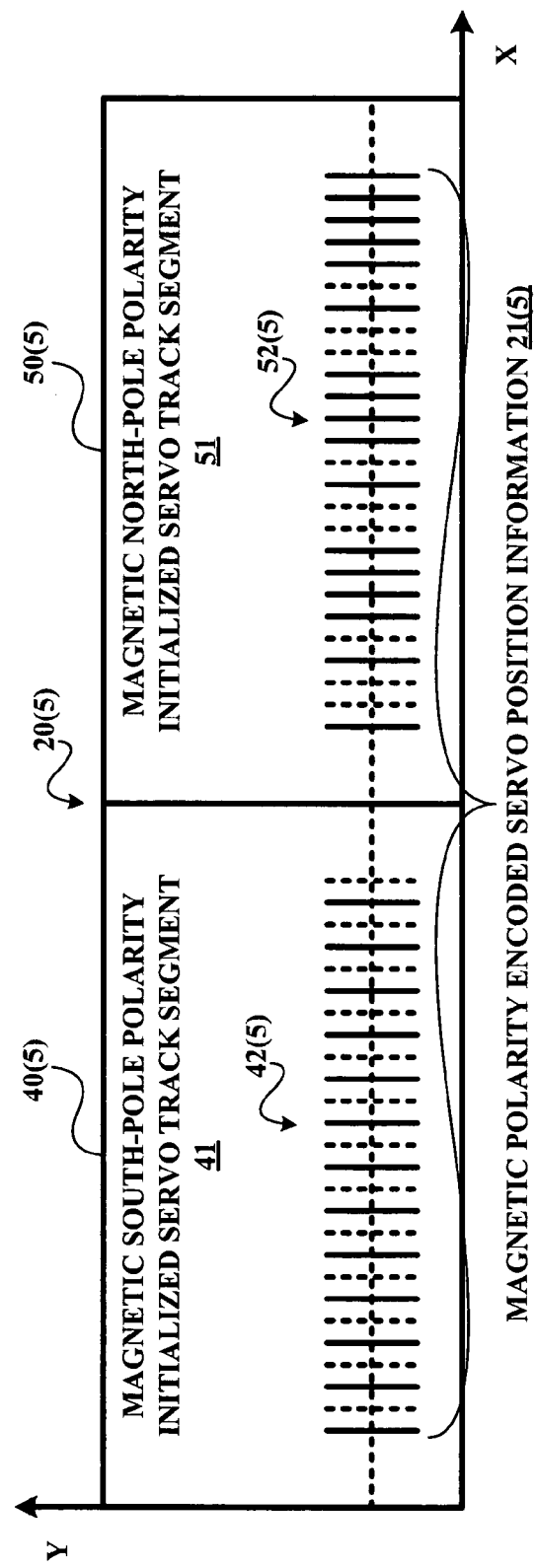
FIG. 13 illustrates a fifth exemplary embodiment of the magnetic polarity encoded servo position information illustrated in FIG. 1 in accordance with the present invention.

FIG. 13 illustrates a magnetic bit-character differential servo pattern based servo embodiment of the present invention. In this embodiment, a magnetic north-pole polarity servo pattern 42(5) includes a magnetic bit-character pattern 1010101010101010101010101010 of magnetic north-pole polarity stripes as would be appreciated by those having ordinary skill in the art. Similarly, a magnetic south-pole polarity servo pattern 52(5) includes a different magnetic bit-character pattern 100101111001011111001011111 of magnetic south-pole polarity stripes as would be appreciated by those having ordinary skill in the art.

Figure 14:
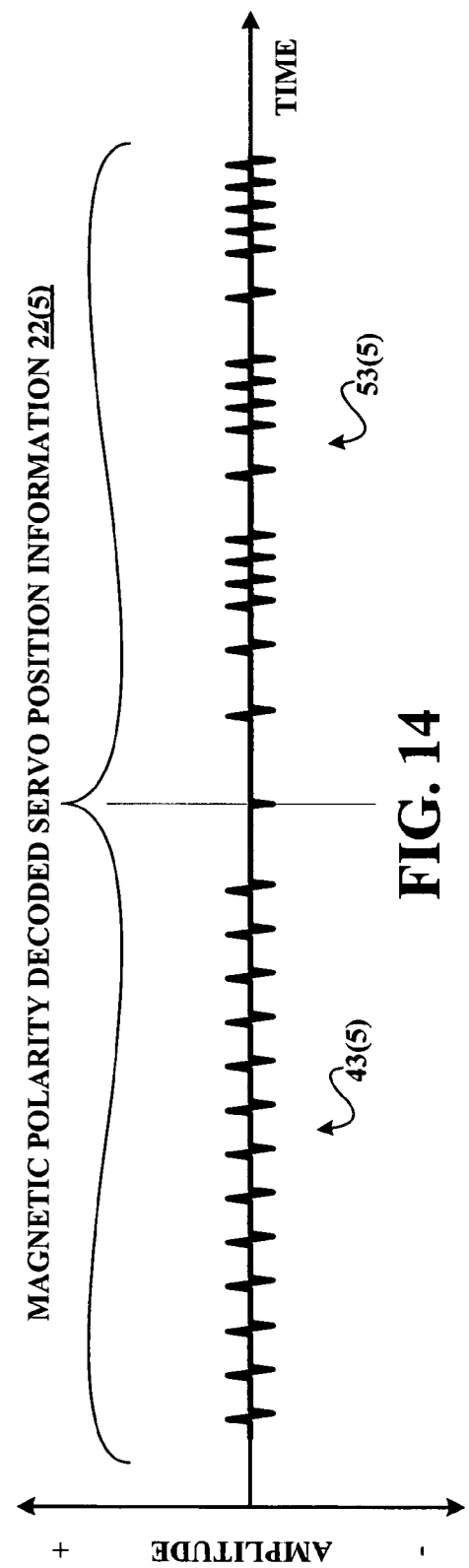
FIG. 14 illustrates exemplary magnetic polarity decoded servo position information associated with the magnetic polarity encoded servo position information illustrated in FIG. 13 in accordance with the present invention.

In operation, a first servo read of magnetic south-north servo band section 40(5) generates magnetic north-pole polarity servo position signals 43(5) as shown in FIG. 14 that are representative of the magnetic bit-character servo format of magnetic north-pole polarity servo pattern 42(5). Similarly, a second servo read of magnetic north-south servo band section 50(5) generates one or more magnetic south-pole polarity servo position signals 53(5) as shown in FIG. 14 that are representative of the different magnetic bit-character based servo format of magnetic south-pole polarity servo pattern 52(5). Collectively, magnetic north-pole polarity servo position signals 43(5) and magnetic south-pole polarity servo position signals 53(5) represent magnetic polarity decoded servo position information 22(5) for facilitating a determination of a translational position of a servo transducer (not shown) along a translation axis Y. Magnetic polarity decoded servo position information 22(5) may also facilitate a determination of a refined transducing position of the servo transducer along a transducing axis X.

Referring to FIGS. 1 and 3, those having ordinary skill in the art will appreciate the unlimited variations in servo patterns 42 and 52 as evidenced by FIGS. 5, 7, 9, 11 and 13. Those having ordinary skill in the art will further appreciate the numerous advantages of the present invention, such as, for example, an ability to implement a servo control system in an uncomplicated yet innovative manner.

Figure 15:
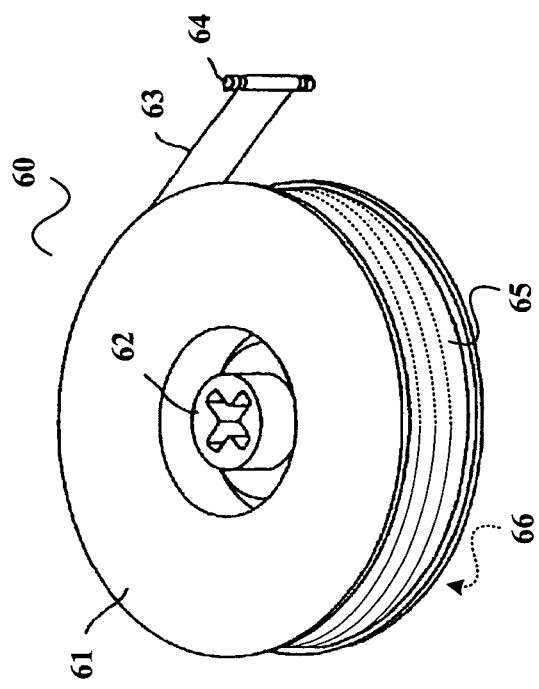
FIG. 15 illustrates one embodiment of a tape storage media in accordance with the present invention.
Figure 16:
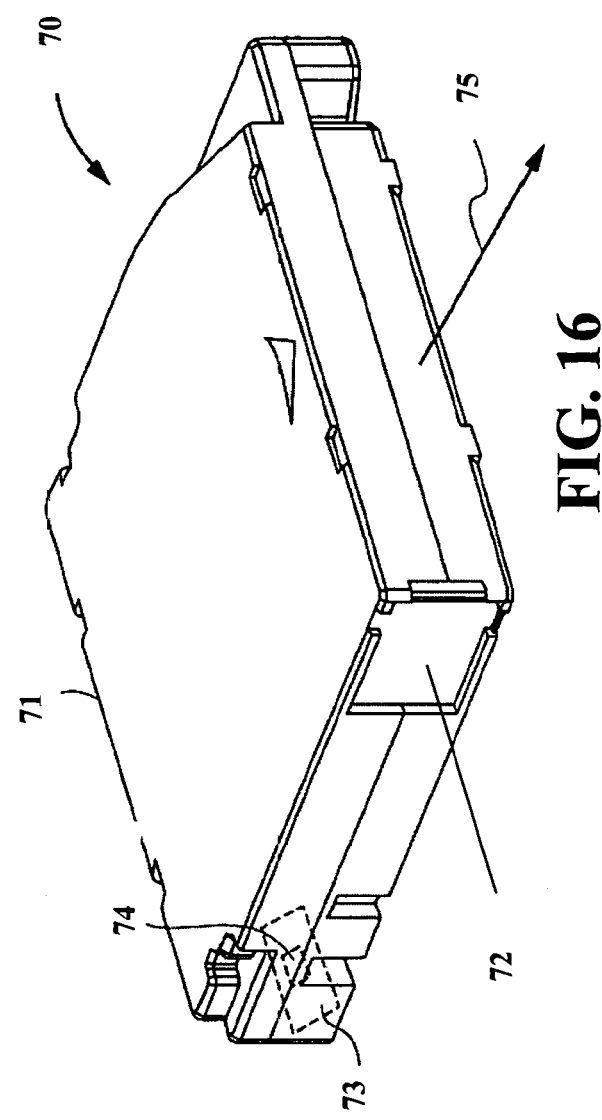
FIG. 16 illustrates one embodiment of a tape storage cartridge in accordance with the present invention.

FIGS. 15 and 16 respectively illustrate a tape storage media 60 as an exemplary form of a magnetic storage media for practicing the inventive principles of the present invention as previously described herein, and a tape storage cartridge 70 as an exemplary form of a magnetic storage cartridge for practicing the inventive principles of the present invention as previously described herein. Tape storage media 60 is contained with a shell housing 71 of tape storage cartridge 70 that is adapted to interface with a tape drive (not shown).

Specifically, tape cartridge 70 includes exterior cartridge shell 71 and sliding door 72. Sliding door 72 is slid open when tape cartridge 70 is inserted into a tape drive (not shown). Sliding door 72 is normally closed when tape cartridge 70 is not in use, so that debris and contaminants do not enter tape cartridge 70 and degrade tape storage media 60. The direction that tape cartridge 70 is slid into the tape drive is shown as direction 75. Tape cartridge 70 also contains a cartridge memory 74, which is on a printed circuit board 73. Cartridge memory 74 is preferably at a 45° angle, to allow the tape drive and pickers of an automated storage library (not shown) to access the contents of cartridge memory 74.

Tape storage media 60 includes a tape reel 61, which is prevented from rotation by a brake button 62 when tape cartridge 70 is inserted in a tape drive (not shown). The tape drive releases brake button 62 when tape cartridge 70 is inserted into the tape drive, which then allows the free rotation of tape reel 61. Tape reel 61 is wound with tape 65, which is preferably magnetic tape. Alternatively, tape 65 could equally be magneto-optical or optical phase-change tape. On the free end of tape 65 is an optional leader tape 63 and leader pin 64. When tape cartridge 70 is slid into the tape drive, sliding door 72 is opened, and the tape drive threads leader pin 64 and attached leader tape 63 and tape 65 through the tape path. Tape 65 may be a data tape or a cleaner tape. Tape 65 may use the identical formulation of tape for both data and cleaning purposes. The contents of cartridge memory 74 are used to distinguish tape cartridge 70 as either a data cartridge or a cleaner cartridge. Optional leader tape 63 is preferably a thicker section of tape 65 which better withstands the load/unload operations of the tape drive.

As related to the a servo control of tape 65, servo tracks 66 are recorded on tape 65 in accordance with the inventive principles of the present invention. In particular, one or more servo bands implementing a version of the FIG. 1 servo band embodiment and/or a version of the FIG. 2 servo band embodiment are recorded on servo tracks 66 to thereby facilitate an advantageous execution of a servo control of tape 65.

Figure 17:
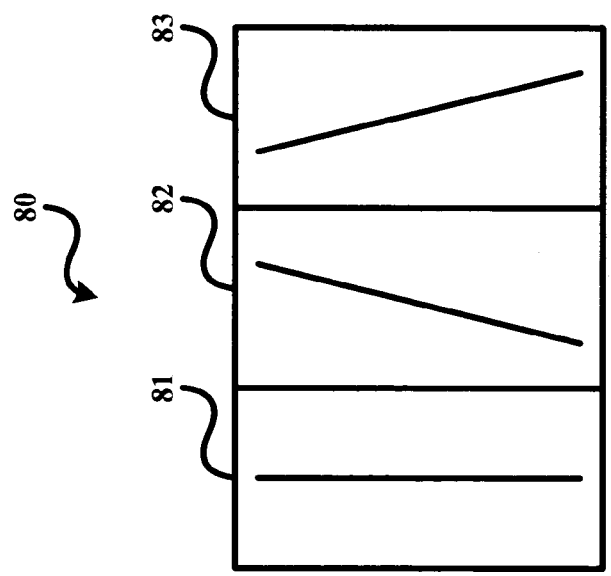
FIG. 17 illustrates one embodiment of a servo write head in accordance with the present invention.

FIG. 17 illustrates a servo write head 80 as an exemplary form of a servo write head for practicing the inventive principles of the present invention as previously described herein as related to FIGS. 5, 7, 9 and 11. Servo write head 80 includes an erase element 81, a backward-slash stripe write element 82 and a forward-slash stripe write element 83. In operation, a servo track segment of a magnetic storage media (e.g., media 60) is initialized in either a magnetic north-pole polarity or a magnetic south-pole polarity by a selectively pre-erasing of the servo track segment in either a magnetic north-pole polarity or a magnetic south-pole polarity. Next, a version of a time based servo pattern of the present invention can be recorded in the opposite magnetic polarity onto the pre-erased servo track segment. In an alternate embodiment, an additional element 81 (not shown) is added next to stripe write element 83 to facilitate an erasing and writing of the timing based servo pattern in either direction of magnetic tape 65.

Figure 18:
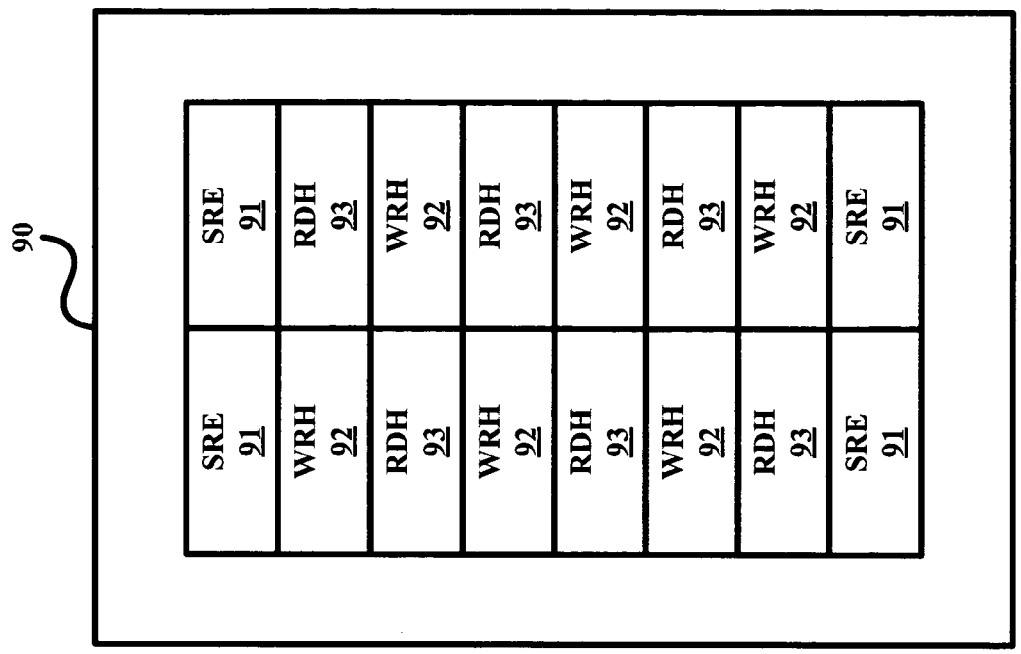
FIG. 18 illustrates one embodiment of a servo transducer in accordance with the present invention.

FIG. 18 illustrates a servo transducer 90 as an exemplary form of a servo transducer for practicing the inventive principles of the present invention as previously described herein. Servo transducer 90 includes servo read elements ("SRE") 91, write heads ("WRH") 92 and read heads ("RDH") 93 in an arrangement that facilitates a use of elements 91 in properly positioning heads 92 and 93 along a desired data track for performing a read-after-write technique as data is being recorded on that data track.

FIGS. 19 and 20 respectively illustrate a front end 101 and rear end 102 of a tape drive 100. Installed within tape drive 100 is a servo control system for positioning a transducer (e.g., transducer 90 shown in FIG. 18) adjacent a surface of a tape storage media (e.g., tape storage media 60 shown in FIG. 15) whereby one or more servo read heads of the transducer are operable to read servo patterns 42 and 52 (FIG. 1) of the present invention as recorded on one or more servo tracks of the tape storage media.

Figure 21:
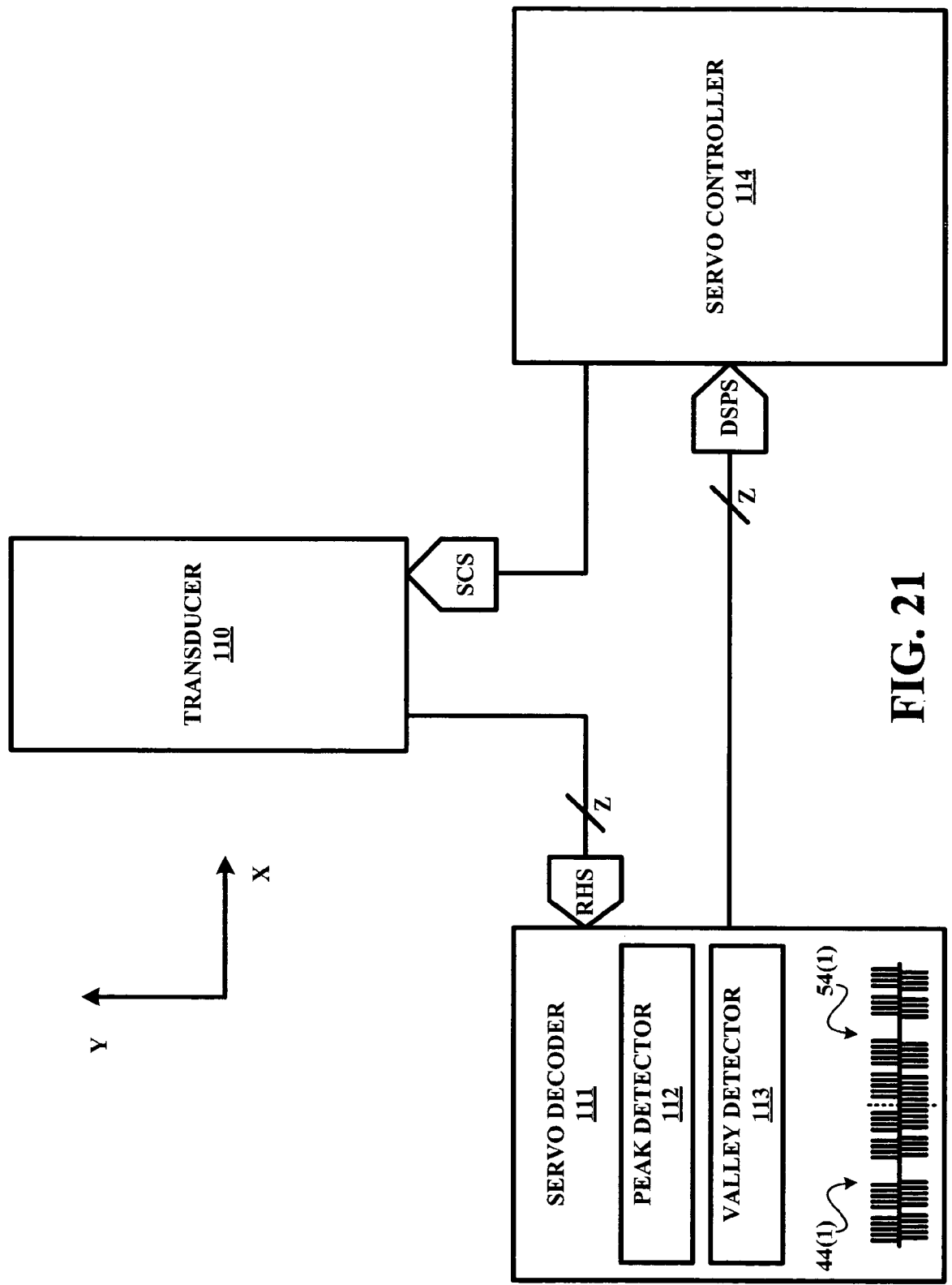
FIG. 21 illustrates one embodiment of a servo control system in accordance with the present invention.

FIG. 21 illustrates an exemplary servo control system of the present invention employing a transducer 110 (e.g., transducer 90 shown in FIG. 18), a servo decoder 111 and a servo controller 114. Transducer 110 includes one or more servo read heads whereby each servo read head is operable to read servo patterns 42 and 52 of the present invention as recorded on a servo track of the tape storage media to thereby generate a read head signal RHS representative of servo patterns 42 and 52. Servo decoder 111 decodes each read head signal RHS and generates a decoded servo position signal DSPS that indicates a position of the corresponding servo read head relative to tape storage media. Servo controller 114 is operable to generate a servo control signal SCS based on each decoded servo position signal DSPS generated by servo decoder 111 whereby a translation assembly (not shown) of transducer 110 is selectively activated in response to servo control signal SCS to thereby move transducer 110 relative to the tape storage media along translation axis Y as needed.

In order to decode each read head signal RHS, servo decoder 111 employs a peak detector 112 and a valley detector 113 per each servo read head of transducer 110. Each peak detector 112 generates a peak detection signal and each valley detector 113 generates a valley detection signal whereby the peak detection signal(s) and the valley detection signal(s) are further processed to generate the decoded servo position signal(s) DSPS as would be appreciated by those having ordinary skill in the art. Specifically, peak detector 112 and valley detector 113 act in combination to detect the peak-valley-peak-valley representative of position signals 43 (FIG. 2) and the valley-peak-valley-peak representative of position signals 53 (FIG. 2). In this way, drive 100 both gathers the decoded servo position signal DSPS and differentiates between servo pattern 42 (FIG. 1) and servo pattern 52 (FIG. 1). For example, peak detector 112 and valley detector 113 act in combination to detect the peak-valley-peak-valley representative 44(1) of position signals 43(1) (FIG. 6) and the valley-peak-valley-peak representative 54(1) of position signals 53(1) (FIG. 6). As such, drive 100 both gathers decoded servo position signal DSPS and differentiates between servo pattern 42(1) (FIG. 5) and servo pattern 52(1) (FIG. 5). Additionally, the amplitude of the peaks and valleys can be detected to differentiate between position signals 43 and position signals 53, in particular position signals 43(4) and position signals 53(4) shown in FIG. 12.

Figure 22:
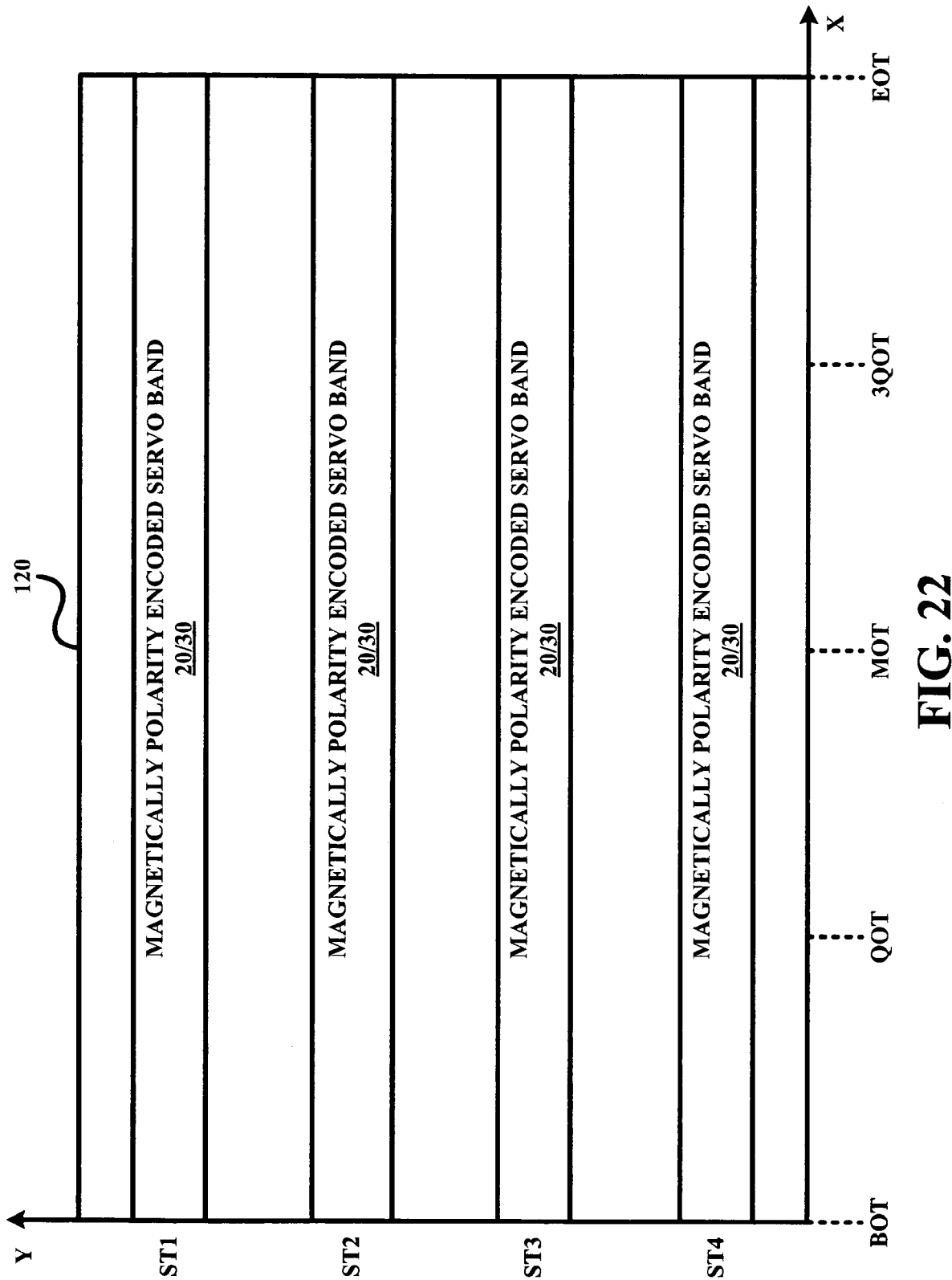
FIG. 22 illustrates one embodiment of a servo linear encoder in accordance with the present invention.

Referring to FIGS. 1 and 3, those having ordinary skill in the art will appreciate unlimited variations of linear encoders are possible based on the inventive principles of magnetic polarity encoded servo bands 20 and 30. To illustrates this point, FIG. 22 illustrates an exemplary linear encoder having four (4) magnetic polarity encoded servo bands 20/30 recorded on a servo tracks ST1-ST4 of a magnetic tape 120, which is shown as having four quadrants defined by a beginning-of-tape ("BOT"), a quarter-of-tape ("QOT"), a middle-of-tape ("MOT"), a three-quarter-of-tape ("3QOT") and an end-of-tape ("EOT"). Each magnetic polarity encoded servo band 20/30 is derived from the inventive principles of magnetic polarity encoded servo band 20 and/or magnetic polarity encoded servo band 30.

In practice, the present invention does not impose any limitations or any restrictions as to the format of magnetic polarity encoded servo band 20/30 as incorporated in a linear encoder. Thus, the following description of exemplary embodiments of magnetic polarity encoded servo bands 20/30 as incorporated in a linear encoder neither limits nor restricts the scope of formats of magnetic polarity encoded servo bands 20/30.

Figure 23:
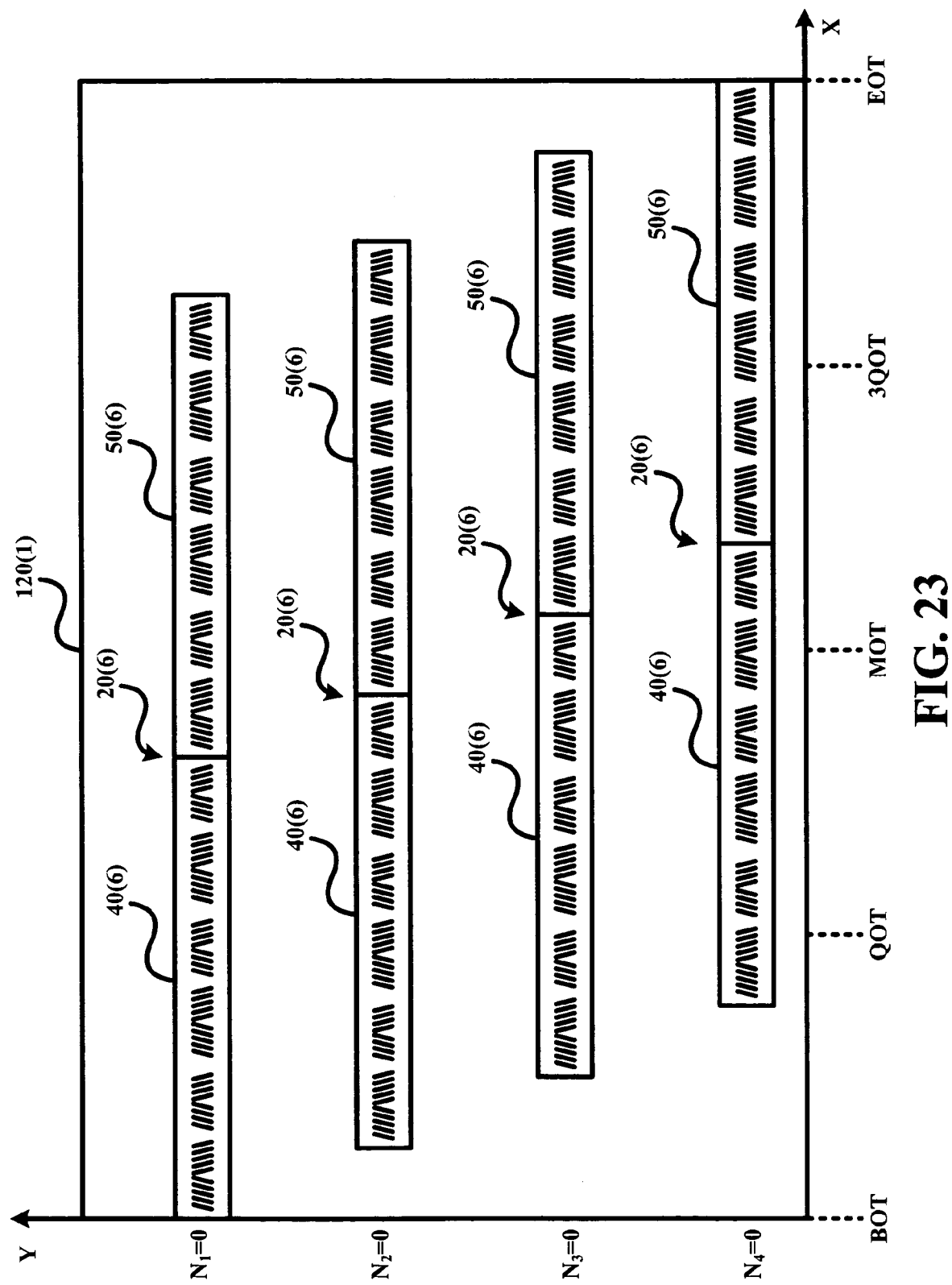
FIG. 23 illustrates a first exemplary embodiment of the servo linear encoder illustrated in FIG. 22 in accordance with the present invention.

FIG. 23 illustrates an exemplary linear encoder having four (4) magnetic polarity encoded servo bands 20(6) recorded on servo tracks ST1-ST4 of magnetic tape 120(1). For each magnetic polarity encoded servo band 20(6), a total number of magnetic north-south servo band sections 40(6) and a total number of magnetic south-north servo band sections 50(6) is $2^N$, where N=0 as illustrated. Also for each magnetic polarity encoded servo band 20(6), magnetic north-south servo band section 40(6) and magnetic south-north servo band section 50(6) have identical formats of opposite polarities. To facilitate a determination of a translational position of a servo transducer (not shown) along translation axis Y, the four (4) magnetic polarity encoded servo bands 20(6) are offset from each within a first quadrant of magnetic tape 120(1) defined by the beginning-of-tape and the quarter-of-tape. To facilitate a determination of a refined transducing position of the servo transducer along transducing axis X, the four (4) magnetic polarity encoded servo bands 20(6) may incorporate an alphanumeric encoding and/or a magnetic intensity encoding as taught herein.

Figure 24:
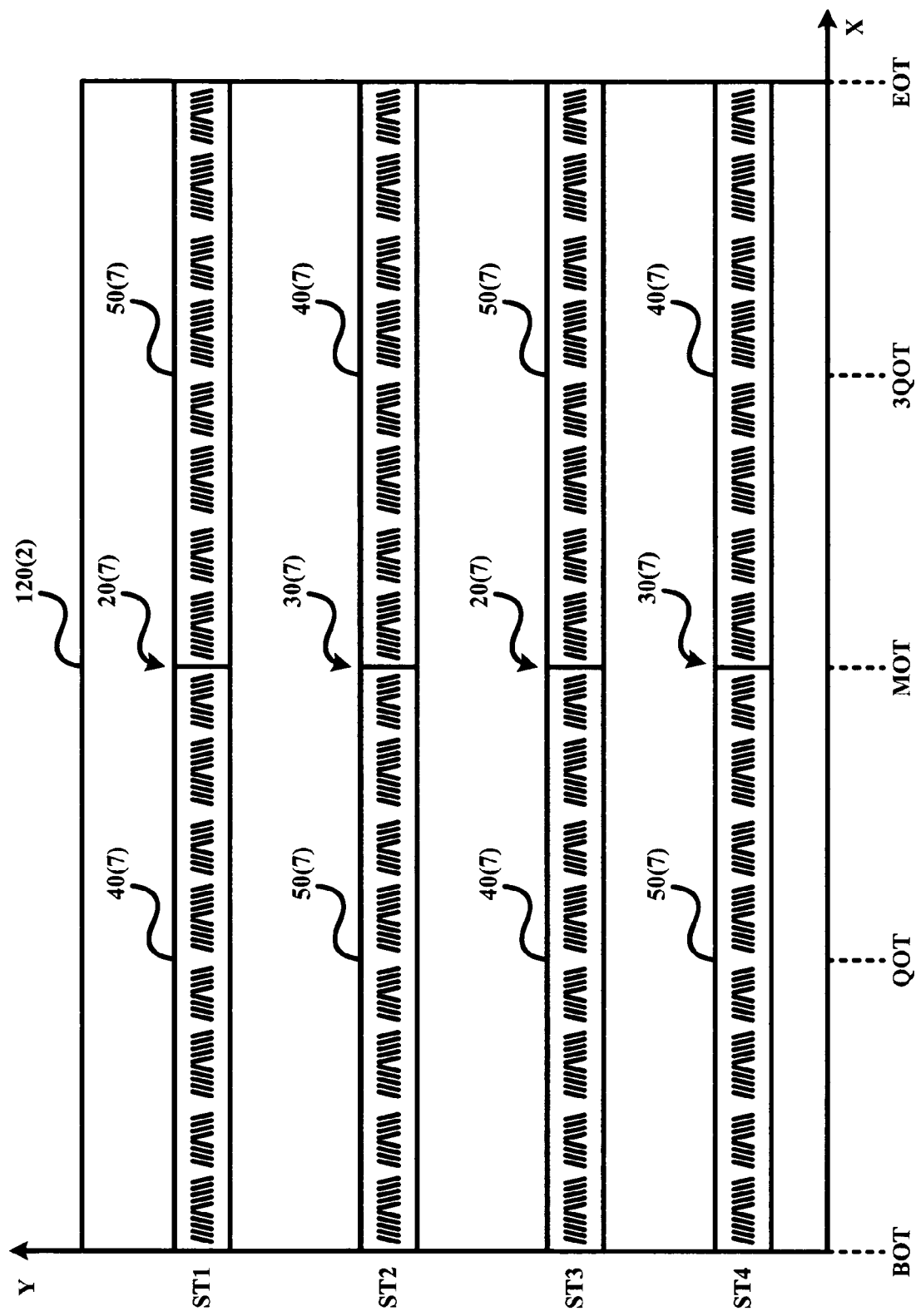
FIG. 24 illustrates a second exemplary embodiment of the servo linear encoder illustrated in FIG. 22 in accordance with the present invention.

FIG. 24 illustrates an exemplary linear encoder having two (2) magnetic polarity encoded servo bands 20(7) recorded on servo tracks ST1 and ST3 of a magnetic tape 120(2) and two (2) magnetic polarity encoded servo bands 30(7) recorded on servo tracks ST2 and ST4 of magnetic tape 120(2). For each magnetic polarity encoded servo band 20(7) and 30(7), a total number of magnetic north-south servo band sections 40(7) and a total number of magnetic south-north servo band sections 50(7) is $2^N$, where N=0 as illustrated. Also for each magnetic polarity encoded servo band 20(7) and 30(7), magnetic north-south servo band section 40(7) and magnetic south-north servo band section 50(7) have identical formats of opposite polarities. Magnetic polarity encoded servo band 20(7) and 30(7) are interleaved along translation axis Y to facilitate a determination of a translational position of a servo transducer (not shown) along translation axis Y. To facilitate a determination of a refined transducing position of the servo transducer along transducing axis X, the four (4) magnetic polarity encoded servo bands 20(7) and 30(7) may incorporate an alphanumeric encoding and/or a magnetic intensity encoding as taught herein.

Figure 25:
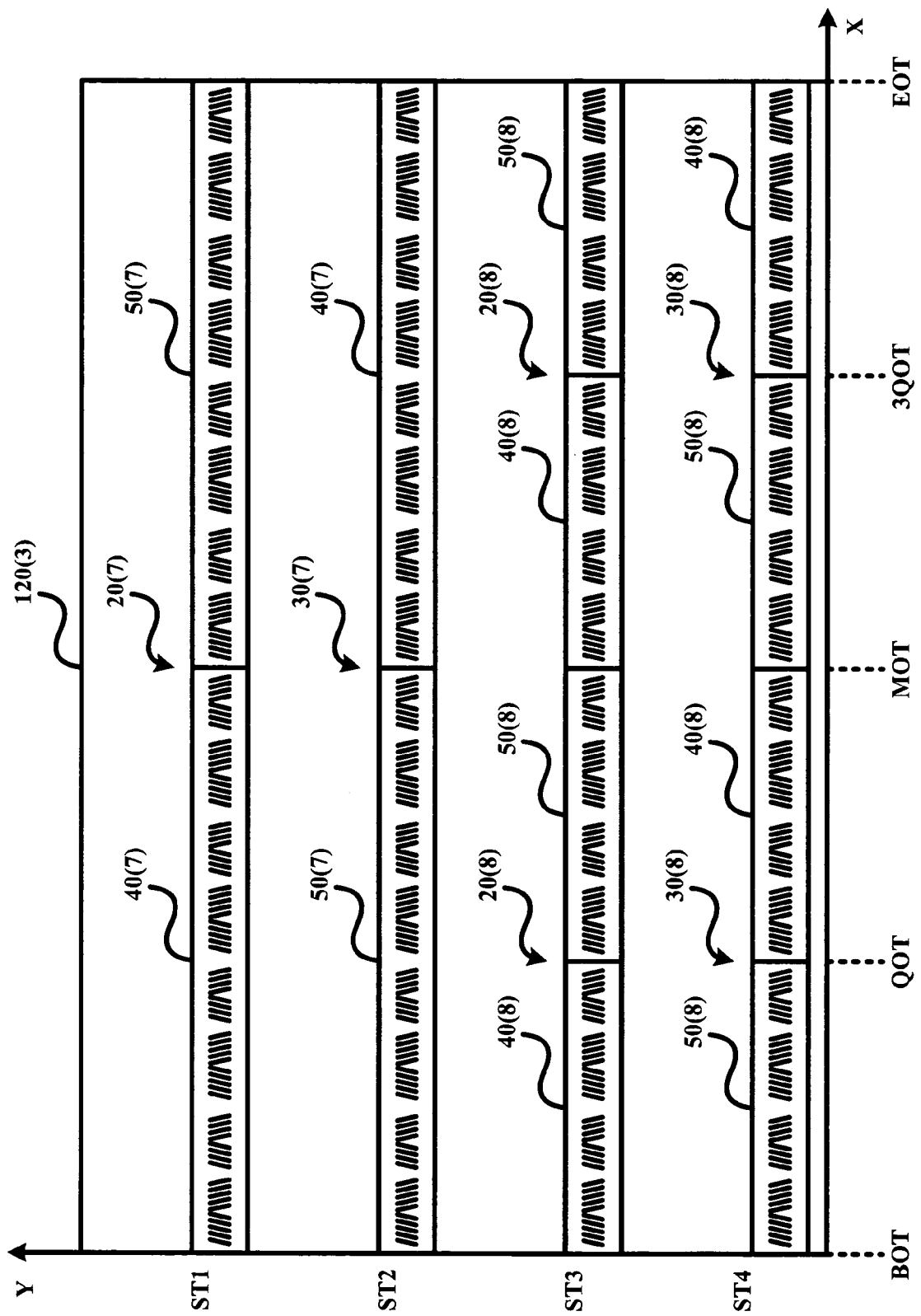
FIG. 25 illustrates a third exemplary embodiment of the servo linear encoder illustrated in FIG. 22 in accordance with the present invention.

FIG. 25 illustrates an exemplary linear encoder having one (1) magnetic polarity encoded servo band 20(7) recorded on a servo track ST1 of a magnetic tape 120(3), one (1) magnetic polarity encoded servo band 30(7) recorded on a servo track ST2 of magnetic tape 120(3), two (2) magnetic polarity encoded servo bands 20(8) recorded on a servo track ST3 of magnetic tape 120(3) and two (2) magnetic polarity encoded servo bands 30(8) recorded on a servo track ST4 of magnetic tape 120(3). For each magnetic polarity encoded servo band 20(7) and 30(7), a total number of magnetic north-south servo band sections 40(7) and a total number of magnetic south-north servo band sections 50(7) is given by $2^N$, where N=0 as illustrated. For each magnetic polarity encoded servo band 20(8) and 30(8), a total number of magnetic north-south servo band sections 40(8) and a total number of magnetic south-north servo band sections 50(8) is given by $2^N$, where N=1 as illustrated.

Also for each magnetic polarity encoded servo band 20(7) and 30(7), magnetic north-south servo band section 40(7) and magnetic south-north servo band section 50(7) have identical formats of opposite polarities, and for each magnetic polarity encoded servo band 20(8) and 30(8), magnetic north-south servo band section 40(8) and magnetic south-north servo band section 50(8) have identical formats of opposite polarities. To facilitate a determination of a translational position of a servo transducer (not shown) along translation axis Y, the first quadrant (BOT-QOT) is defined by a 0101 servo track ST1-ST4 layout along translation axis Y, the second quadrant (QOT-MOT) is defined by a 0110 servo track ST1-ST4 layout along translation axis Y, the third quadrant (MOT-3QOT) is defined by a 1001 servo track ST1-ST4 layout along translation axis Y, and the fourth quadrant (3QOT-eOT) is defined by a 1010 servo track ST1-ST4 layout along translation axis Y. To facilitate a determination of a refined transducing position of the servo transducer along transducing axis X, the four (4) magnetic polarity encoded servo bands 20(7), 20(8), 30(7) and 30(8) may incorporate an alphanumeric encoding and/or a magnetic intensity encoding as taught herein.

Figure 26:
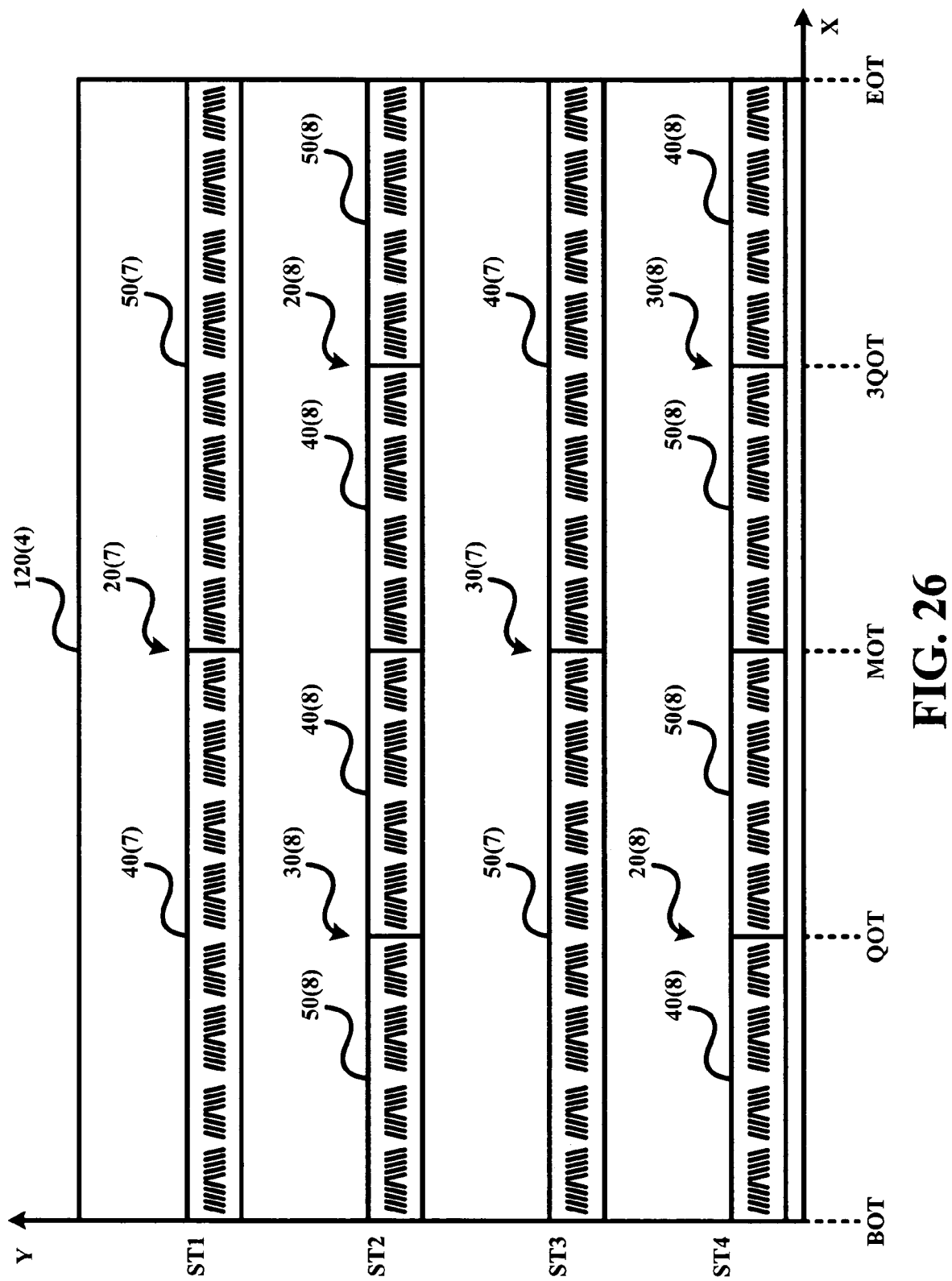
FIG. 26 illustrates a fourth exemplary embodiment of the servo linear encoder illustrated in FIG. 22 in accordance with the present invention.

FIG. 26 illustrates an exemplary linear encoder having one (1) magnetic polarity encoded servo band 20(7) recorded on a servo track ST1 of a magnetic tape 120(4), one (1) magnetic polarity encoded servo band 30(8) and one (1) magnetic polarity encoded servo band 20(8) recorded on a servo track ST2 of magnetic tape 120(4), one (1) magnetic polarity encoded servo band 30(7) recorded on a servo track ST3 of magnetic tape 120(4), and one (1) magnetic polarity encoded servo band 20(8) and one (1) magnetic polarity encoded servo band 30(8) recorded on a servo track ST4 of magnetic tape 120(3). Again, for each magnetic polarity encoded servo band 20(7) and 30(7), a total number of magnetic north-south servo band sections 40(7) and a total number of magnetic south-north servo band sections 50(7) is given by $2^N$, where N=0 as illustrated. For each magnetic polarity encoded servo band 20(8) and 30(8), a total number of magnetic north-south servo band sections 40(8) and a total number of magnetic south-north servo band sections 50(8) is given by $2^N$, where N=1 as illustrated.

Also for each magnetic polarity encoded servo band 20(7) and 30(7), magnetic north-south servo band section 40(7) and magnetic south-north servo band section 50(7) have identical formats of opposite polarities, and for each magnetic polarity encoded servo band 20(8) and 30(8), magnetic north-south servo band section 40(8) and magnetic south-north servo band section 50(8) have identical formats of opposite polarities. To facilitate a determination of a translational position of a servo transducer (not shown) along translation axis Y, the first quadrant (BOT-QOT) is defined by a 0110 servo track ST1-ST4 layout along translation axis Y, the second quadrant (QOT-MOT) is defined by a 0011 servo track ST1-ST4 layout along translation axis Y, the third quadrant (MOT-3QOT) is defined by a 1001 servo track ST1-ST4 layout along translation axis Y, and the fourth quadrant (3QOT-eOT) is defined by a 1100 servo track ST1-ST4 layout along translation axis Y. To facilitate a determination of a refined transducing position of the servo transducer along transducing axis X, the four (4) magnetic polarity encoded servo bands 20(7), 20(8), 30(7) and 30(8) may incorporate an alphanumeric encoding and/or a magnetic intensity encoding as taught herein.

Figure 27:
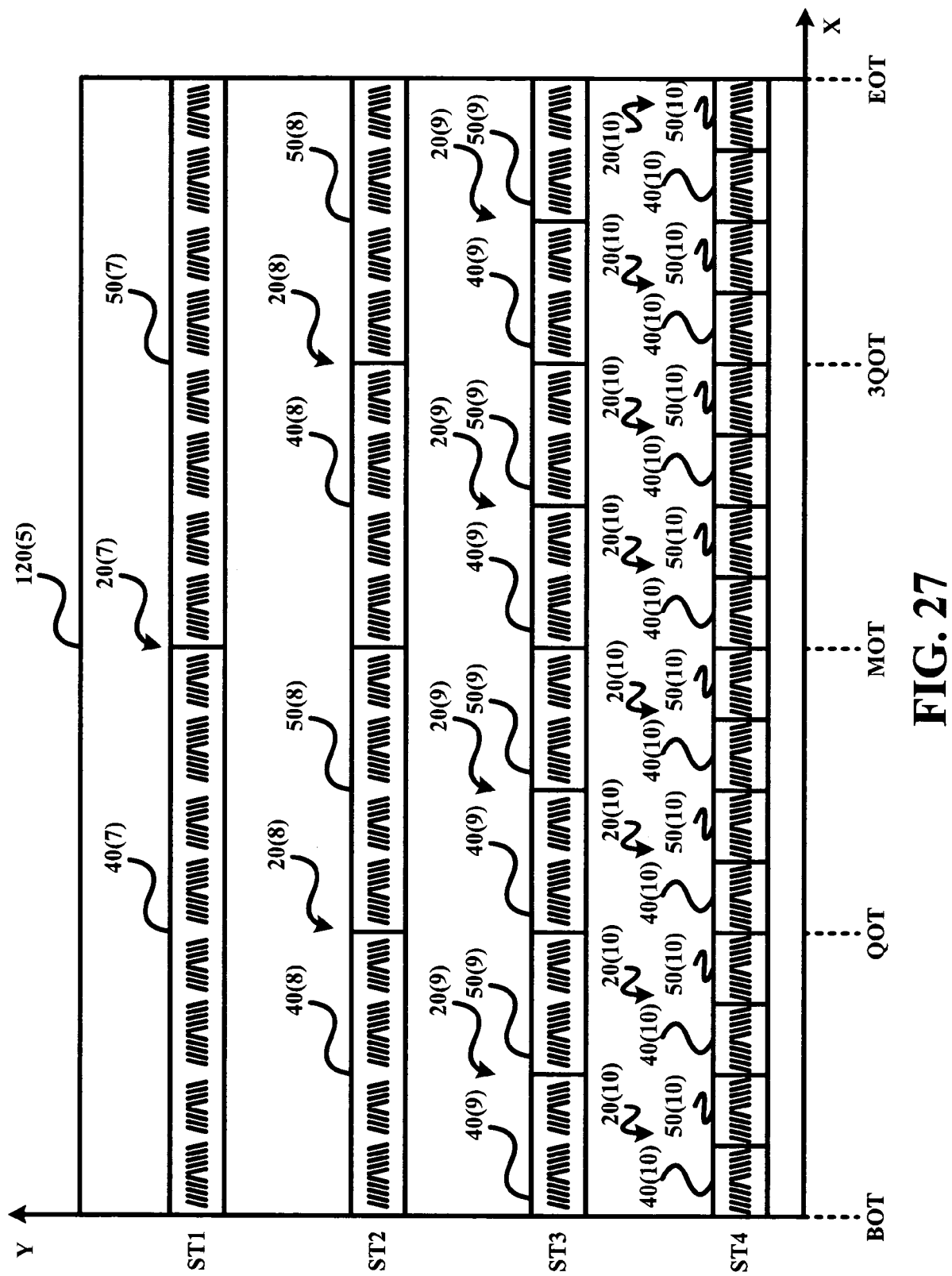
FIG. 27 illustrates a fifth exemplary embodiment of the servo linear encoder illustrated in FIG. 22 in accordance with the present invention.

FIG. 27 illustrates an exemplary linear encoder having one (1) magnetic polarity encoded servo band 20(7) recorded on a servo track ST1 of a magnetic tape 120(5), two (2) magnetic polarity encoded servo bands 20(8) recorded on a servo track ST2 of magnetic tape 120(5), four (4) magnetic polarity encoded servo bands 20(9) recorded on a servo track ST3 of magnetic tape 120(5), and eight (8) magnetic polarity encoded servo band 20(10) recorded on a servo track ST4 of magnetic tape 120(5). For magnetic polarity encoded servo band 20(7), a total number of magnetic north-south servo band sections 40(7) and a total number of magnetic south-north servo band sections 50(7) is given by $2^N$, where N=0 as illustrated. For each magnetic polarity encoded servo band 20(8), a total number of magnetic north-south servo band sections 40(8) and a total number of magnetic south-north servo band sections 50(8) is given by $2^N$, where N=1 as illustrated. For each magnetic polarity encoded servo band 20(9), a total number of magnetic north-south servo band sections 40(9) and a total number of magnetic south-north servo band sections 50(9) is given by $2^N$, where N=2 as illustrated. For each magnetic polarity encoded servo band 20(10), a total number of magnetic north-south servo band sections 40(10) and a total number of magnetic south-north servo band sections 50(10) is given by $2^N$, where N=3 as illustrated.

For each magnetic polarity encoded servo band 20(7), magnetic north-south servo band section 40(7) and magnetic south-north servo band section 50(7) have identical formats of opposite polarities. For each magnetic polarity encoded servo band 20(8), magnetic north-south servo band section 40(8) and magnetic south-north servo band section 50(8) have identical formats of opposite polarities. For each magnetic polarity encoded servo band 20(9), magnetic north-south servo band section 40(9) and magnetic south-north servo band section 50(9) have identical formats of opposite polarities. For each magnetic polarity encoded servo band 20(10), magnetic north-south servo band section 40(10) and magnetic south-north servo band section 50(10) have identical formats of opposite polarities.

To facilitate a determination of a translational position of a servo transducer (not shown) along translation axis Y, the first quadrant (BOT-QOT) is defined by a 0000-0001-0010-0011 servo track ST1-ST4 layout along translation axis Y and transducing axis X, the second quadrant (QOT-MOT) is defined by a 0100-0101-0110-0111 servo track ST1-ST4 layout along translation axis Y and transducing axis X, the third quadrant (MOT-3QOT) is defined by a 1000-1001-1010-1011 servo track ST1-ST4 layout along translation axis Y and transducing axis X, and the fourth quadrant (3QOT-EOT) is defined by a 1100-1101-1110-1111 servo track ST1-ST4 layout along translation axis Y and transducing axis X. To facilitate a determination of a refined transducing position of the servo transducer along transducing axis X, the four (4) magnetic polarity encoded servo bands 20(7), 20(8), 20(9) and 20(10) may incorporate an alphanumeric encoding and/or a magnetic intensity encoding as taught herein.

Figure 28:
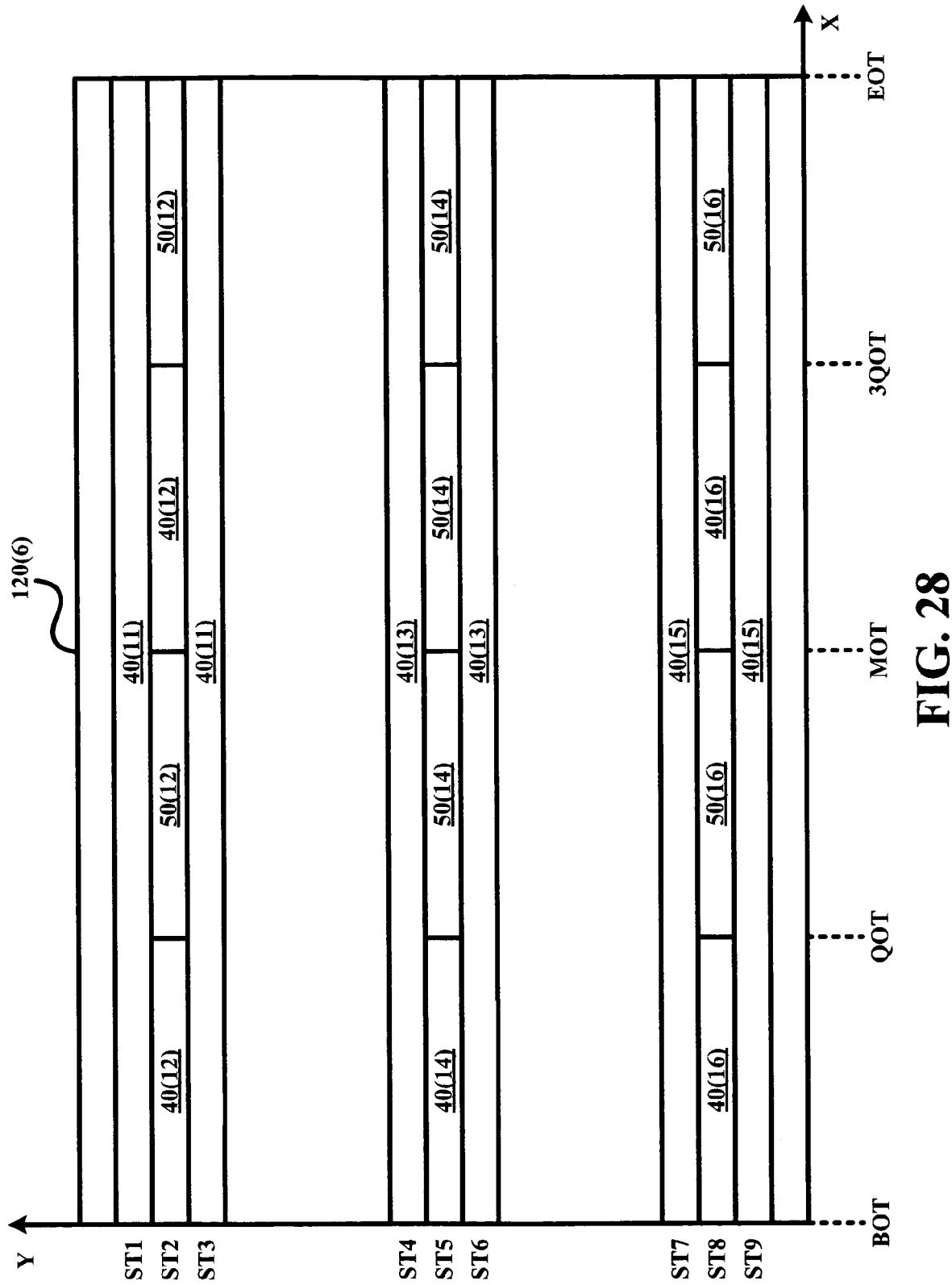
FIG. 28 illustrates a sixth exemplary embodiment of the servo linear encoder illustrated in FIG. 22 in accordance with the present invention.

FIG. 28 illustrates an exemplary linear encoder having three (3) layered servo bands. The first layered servo band includes one (1) magnetic south-north servo band section 40(11) recorded on a servo track ST1 of a magnetic tape 120(6), two (2) magnetic south-north servo band sections 40(12) and two (2) magnetic north-south servo band sections 50(12) recorded on a servo track ST2 of magnetic tape 120(6), and one (1) magnetic south-north servo band section 40(11) recorded on a servo track ST3 of a magnetic tape 120(6). The second layered servo band includes one (1) magnetic south-north servo band section 40(13) recorded on a servo track ST4 of a magnetic tape 120(6), two (2) magnetic south-north servo band sections 40(14) and two (2) magnetic north-south servo band sections 50(14) recorded on a servo track ST5 of magnetic tape 120(6), and one (1) magnetic south-north servo band section 40(13) recorded on a servo track ST6 of a magnetic tape 120(6). The third layered servo band includes one (1) magnetic south-north servo band section 40(15) recorded on a servo track ST7 of a magnetic tape 120(6), two (2) magnetic south-north servo band sections 40(16) and two (2) magnetic north-south servo band sections 50(16) recorded on a servo track ST8 of magnetic tape 120(6), and one (1) magnetic south-north servo band section 40(15) recorded on a servo track ST9 of a magnetic tape 120(6).

For servo track ST2, a total number of magnetic north-south servo band sections 40(12) and a total number of magnetic south-north servo band sections 50(12) are given by $2^N$, where N=1 as illustrated. For servo track ST5, a total number of magnetic north-south servo band sections 40(14) and a total number of magnetic south-north servo band sections 50(14) are given by $2^N$, where N=1 as illustrated. For servo track ST8, a total number of magnetic north-south servo band sections 40(16) and a total number of magnetic south-north servo band sections 50(16) are given by $2^N$, where N=1 as illustrated.

For servo tracks ST1 and ST3, magnetic north-south servo band sections 40(11) have the identical format. For example, magnetic north-south servo band sections 40(11) may include character-bit based magnetic south-pole polarity servo pattern consisting of a repeat of 12-bit character 100010101010. For servo track ST2, magnetic north-south servo band sections 40(12) and magnetic south-north servo band sections 50(12) have different formats of opposite polarities. For example, magnetic north-south servo band sections 40(12) may include character-bit based magnetic south-pole polarity servo pattern consisting of 429 repetitions of a 4-bit character 1010, and magnetic south-north servo band sections 50(12) may include character-bit based magnetic north-pole polarity servo pattern consisting of 64 repetitions of a 26-bit character 10010111100101111001011111.

Similarly, for servo tracks ST4 and ST6, magnetic north-south servo band sections 40(13) have the identical format. For example, magnetic north-south servo band sections 40(13) may include character-bit based magnetic south-pole polarity servo pattern consisting of a repeat of 12-bit character 100010101010. For servo track ST5, magnetic north-south servo band sections 40(14) and magnetic south-north servo band sections 50(14) have different formats of opposite polarities. For example, magnetic north-south servo band sections 40(14) may include character-bit based magnetic south-pole polarity servo pattern consisting of 429 repetitions of a 4-bit character 1010, and magnetic south-north servo band sections 50(14) may include character-bit based magnetic north-pole polarity servo pattern consisting of 64 repetitions of a 26-bit character 10010111100101111001011111.

For servo tracks ST7 and ST9, magnetic north-south servo band sections 40(15) have the identical format. For example, magnetic north-south servo band sections 40(15) may include character-bit based magnetic south-pole polarity servo pattern consisting of a repeat of 12-bit character 100010101010. For servo track ST8, magnetic north-south servo band sections 40(16) and magnetic south-north servo band sections 50(16) have different formats of opposite polarities. For example, magnetic north-south servo band sections 40(16) may include character-bit based magnetic south-pole polarity servo pattern consisting of 429 repetitions of a 4-bit character 1010, and magnetic south-north servo band sections 50(16) may include character-bit based magnetic north-pole polarity servo pattern consisting of 64 repetitions of a 26-bit character 10010111100101111001011111.

Referring to FIGS. 22-28, those having ordinary skill in the art will appreciate various advantages of the present invention. For example, a desired resolution of a linear encoder can straightforwardly be obtained by the formation of the various formations of magnetic polarity encoded servo bands of the present invention. For example, referring to FIG. 27, a variation of the illustrated servo bands would be to have eight servo bands whereby the servo track in the highest number band (N=7) would have 128 magnetic south-north servo band sections and 128 north-south servo band sections for a total of 256 servo band sections. For a tape having a length of 200 meter from beginning-of-tape to the end-of-tape, the coarse position resolution would be about 78 centimeters (i.e., 200/256).

Also by example, referring to FIG. 27, servo track ST4 could define partitions sixteen (16) partitions of magnetic tape 120(5) along the length of magnetic tape 120(5) whereby multiple users could be allowed independent access to the individual partitions. As such, a single user could not lock out all other users until that single user releases the entire tape volume. In fact, individual users could access their individual partitions on tape 120(5), all in parallel, and that access would only be limited by a tape drive's ability to move between the individual partitions.

Those having ordinary skill in the art will appreciate the fact that the exemplary servo bands and linear encoders herein are not drawn to scale, but are illustrated as such with a purpose of facilitating an understanding of the inventive principles of the present invention.

Those having ordinary skill in the art of servo control techniques may also develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A magnetic storage media, comprising:
    at least one magnetic polarity encoded servo band having a width; and
    wherein each magnetic polarity encoded servo band includes:
        at least one magnetic south-north servo band section, each magnetic south-north servo band section including a magnetic south-pole polarity initialized servo track segment across all the width, and a magnetic north-pole polarity servo pattern recorded on the magnetic south-pole polarity initialized servo track segment;
        at least one magnetic north-south servo band section, each magnetic north-south servo band section including a magnetic north-pole polarity initialized servo track segment across all the width, and a magnetic south-pole polarity servo pattern recorded on the magnetic north-pole polarity initialized servo track segment; and
        wherein the at least one magnetic south-north servo band section and the at least one magnetic north-south servo band section are recorded relative to each other on a servo track to represent magnetic polarity encoded servo position information based on each magnetic north-pole polarity servo pattern and each magnetic south-pole polarity servo pattern.

2. The magnetic storage media of claim 1, wherein a first magnetic polarity encoded servo band as recorded on a first servo track is offset from a second magnetic polarity encoded servo band as recorded on a second servo track.

3. The magnetic storage media of claim 1,
    wherein a first magnetic polarity encoded servo band includes a first number of magnetic south-north servo band sections and a second number of magnetic north-south servo band sections; and
    wherein a second magnetic polarity encoded servo band includes a third number of magnetic south-north servo band sections and a fourth number of magnetic north-south servo band sections.

4. The magnetic storage media of claim 3, wherein the first number of magnetic south-north servo band sections is less than the third number of magnetic south-north servo band sections.

5. The magnetic storage media of claim 3, wherein the second number of magnetic north-south servo band sections is less than the fourth number of magnetic north-south servo band sections.

6. The magnetic storage media of claim 3,
    wherein the first number of magnetic south-north servo band sections is less than the third number of magnetic south-north servo band sections; and
    wherein the second number of magnetic north-south servo band sections is less than the fourth number of magnetic north-south servo band sections.

7. The magnetic storage media of claim 3, wherein the first number of magnetic south-north servo band sections is equal to the third number of magnetic south-north servo band sections.

8. The magnetic storage media of claim 3, wherein the second number of magnetic north-south servo band sections is equal to the fourth number of magnetic north-south servo band sections.

9. The magnetic storage media of claim 3,
    wherein the first number of magnetic south-north servo band sections is equal to the third number of magnetic south-north servo band sections; and
    wherein the second number of magnetic north-south servo band sections is equal to the fourth number of magnetic north-south servo band sections.

10. A magnetic storage media cartridge, comprising:
a cartridge housing adapted to interface with a cartridge drive; and
a magnetic storage media contained within the cartridge housing, the magnetic storage media including:
at least one magnetic polarity encoded servo band having a width; and
wherein each magnetic polarity encoded servo band includes:
at least one magnetic south-north servo band section, each magnetic south-north servo band section including a magnetic south-pole polarity initialized servo track segment across all the width, and a magnetic north-pole polarity servo pattern recorded on the magnetic south-pole polarity initialized servo track segment;
at least one magnetic north-south servo band section, each magnetic north-south servo band section including a magnetic north-pole polarity initialized servo track segment across all the width, and a magnetic south-pole polarity servo pattern recorded on the magnetic north-pole polarity initialized servo track segment; and
wherein the at least one magnetic south-north servo band section and the at least one magnetic north-south servo band section are recorded relative to each other on a servo track to represent magnetic polarity encoded servo position information based on each magnetic north-pole polarity servo pattern and each magnetic south-pole polarity servo pattern.

11. The magnetic storage media cartridge of claim 10, wherein a first magnetic polarity encoded servo band as recorded on a first servo track is offset from a second magnetic polarity encoded servo band as recorded on a second servo track.

12. The magnetic storage media cartridge of claim 10,
wherein a first magnetic polarity encoded servo band includes a first number of magnetic south-north servo band sections and a second number of magnetic north-south servo band sections; and
wherein a second magnetic polarity encoded servo band includes a third number of magnetic south-north servo band sections and a fourth number of magnetic north-south servo band sections.

13. The magnetic storage media cartridge of claim 12, wherein the first number of magnetic south-north servo band sections is less than the third number of magnetic south-north servo band sections.

14. The magnetic storage media cartridge of claim 12, wherein the second number of magnetic north-south servo band sections is less than the fourth number of magnetic north-south servo band sections.

15. The magnetic storage media cartridge of claim 12,
wherein the first number of magnetic south-north servo band sections is less than the third number of magnetic south-north servo band sections; and
wherein the second number of magnetic north-south servo band sections is less than the fourth number of magnetic north-south servo band sections.

16. The magnetic storage media cartridge of claim 12, wherein the first number of magnetic south-north servo band sections is equal to the third number of magnetic south-north servo band sections.

17. The magnetic storage media cartridge of claim 12, wherein the second number of magnetic north-south servo band sections is equal to the fourth number of magnetic north-south servo band sections.

18. The magnetic storage media cartridge of claim 12,
wherein the first number of magnetic south-north servo band sections is equal to the third number of magnetic south-north servo band sections; and
wherein the second number of magnetic north-south servo band sections is equal to the fourth number of magnetic north-south servo band sections.

19. A servo write head, comprising:
a first servo erase element of a magnetic first-pole polarity;
a forward-slash stripe write element of a magnetic second-pole polarity;
a backward-slash stripe write element of the magnetic second-pole polarity; and
a second servo erase element of the magnetic first-pole polarity,
wherein the first servo erase element, the forward-slash stripe write element, the backward-slash strip write element, and the second servo erase element are arranged in a single write band, and
the forward-slash stripe write element and the backward-slash strip write element are arranged between the first servo erase element and the second servo erase element.

20. A magnetic storage media drive, comprising:
a transducer including a servo read head operable to generate a read head signal representative of a reading of at least one servo pattern recorded on a magnetic storage media including at least one magnetic polarity encoded servo band having a width, wherein each magnetic polarity encoded servo band includes:
at least one magnetic south-north servo band section, each magnetic south-north servo band section including a magnetic south-pole polarity initialized servo track segment across all the width, and a magnetic north-pole polarity servo pattern recorded on the magnetic south-pole polarity initialized servo track segment;
at least one magnetic north-south servo band section, each magnetic north-south servo band section including a magnetic north-pole polarity initialized servo track segment across all the width, and a magnetic south-pole polarity servo pattern recorded on the magnetic north-pole polarity initialized servo track segment; and
wherein the at least one magnetic south-north servo band section and the at least one magnetic north-south servo band section are recorded relative to each other on a servo track to represent magnetic polarity encoded servo position information based on each magnetic north-pole polarity servo pattern and each magnetic south-pole polarity servo pattern;
a servo decoder in electrical communication with the transducer to receive the read head signal, the servo decoder being operable to generate a decoded servo position signal based on the read head signal, the decoded servo position signal being indicative of a position of the transducer relative to the magnetic storage media; and
a servo controller in electrical communication with the servo decoder to receive the decoded servo position signal, the servo controller being operable to generate a servo control signal for selectively moving the transducer relative to the magnetic storage media.

* * * * *